United States Patent
Pease et al.

(10) Patent No.: US 6,858,857 B2
(45) Date of Patent: Feb. 22, 2005

(54) MODULAR NON-CONTACT MEASUREMENT DEVICE FOR QUICKLY AND ACCURATELY OBTAINING DIMENSIONAL MEASUREMENT DATA

(75) Inventors: Alfred A. Pease, Ann Arbor, MI (US); Tim Ewald, Ann Arbor, MI (US)

(73) Assignee: Perceptron, Inc., Plymouth, MI (US)

( * ) Notice: Subject to any disclaimer, the term of this patent is extended or adjusted under 35 U.S.C. 154(b) by 50 days.

(21) Appl. No.: 10/429,620

(22) Filed: May 5, 2003

(65) Prior Publication Data

US 2003/0197138 A1 Oct. 23, 2003

Related U.S. Application Data

(63) Continuation-in-part of application No. 09/803,535, filed on Mar. 9, 2001, now Pat. No. 6,593,587.
(60) Provisional application No. 60/247,270, filed on Nov. 10, 2000.

(51) Int. Cl.[7] ............................................. G01B 11/00
(52) U.S. Cl. ............................ 250/559.19; 250/559.22
(58) Field of Search .................... 250/559.01–559.49, 250/206.2, 208.6, 239; 356/485, 492, 496, 141.5, 355, 357, 625, 614–615, 621–623, 603, 630, 634–63

(56) References Cited

U.S. PATENT DOCUMENTS

| | | | |
|---|---|---|---|
| 4,227,813 A | 10/1980 | Pirlet | |
| 4,730,190 A | 3/1988 | Win et al. | |
| 4,862,598 A | 9/1989 | Barlow et al. | |
| 4,938,589 A | * 7/1990 | Breithaupt | ................. 356/3.05 |
| 5,207,007 A | * 5/1993 | Cucinotta et al. | ............. 33/640 |
| 6,049,385 A | 4/2000 | Norita et al. | |
| 6,137,564 A | 10/2000 | Schmidt et al. | |
| 6,172,755 B1 | 1/2001 | Norita et al. | |
| 6,243,165 B1 | 6/2001 | Norita et al. | |
| 6,256,595 B1 | 7/2001 | Schwalb et al. | |
| 6,373,579 B1 | 4/2002 | Ober et al. | |

* cited by examiner

Primary Examiner—Edward J. Glick
Assistant Examiner—Hong Song
(74) Attorney, Agent, or Firm—Harness, Dickey & Pierce, P.L.C.

(57) ABSTRACT

A modular measurement device is provided for quickly and accurately performing non-contact measurements of various objects at different locations within a commercial or residential work area. The modular measurement device generally includes a laser base that is operable to project light onto a measured object; and a portable measurement module adapted to receive light reflected from a surface of the measured object and operable to determine dimensional measurement data for the measured object, where the portable measurement module is configured to releasably couple to the laser base. The operational components of the measurement device are partitioned between the portable measurement module and the laser base. In this way, a single portable measurement module having more expensive operational components may be used with different, less expensive laser bases, where each laser base may be adapted for a different application.

16 Claims, 22 Drawing Sheets

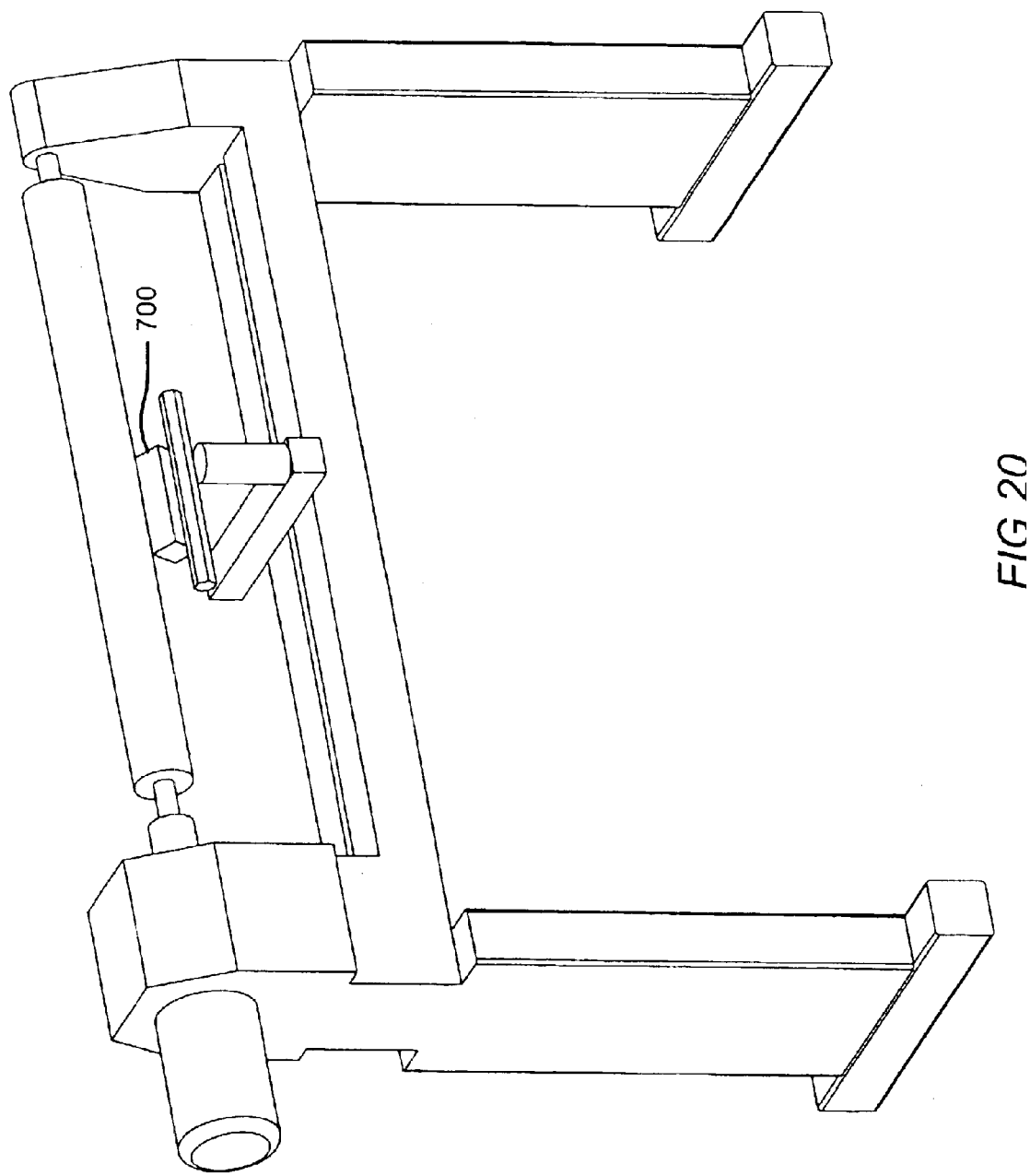

US 6,858,857 B2

MODULAR NON-CONTACT MEASUREMENT DEVICE FOR QUICKLY AND ACCURATELY OBTAINING DIMENSIONAL MEASUREMENT DATA

CROSS-REFERENCE TO RELATED APPLICATIONS

This is a continuation-in-part, application of U.S. patent application Ser. No. 09/803,535; filed Mar. 9, 2001, now U.S. Pat. No. 6,593,587, and claims priority under 35 U.S.C. §119(e) to U.S. Provisional Application No. 60/247,270 filed on Nov. 10, 2000 the specification and drawings of which are hereby expressly incorporated by reference.

BACKGROUND AND SUMMARY OF THE INVENTION

The present invention relates generally to a non-contact measurement device and, more particularly, a modular measurement device for quickly and accurately performing non-contact measurements of various objects at different locations within a commercial or residential work area.

Measurement of angles and dimensions of wood products and woodworking equipment has up to now been performed through the use of various mechanical and electronic calipers, squares, protractors, steel rules, tape measurers, levels, and point range measuring devices. These various devices suffer from mechanical inaccuracies and human visual limitations (such as parallax). Furthermore, these devices require sometimes difficult direct or impossible physical contact with the object being measured. It is the purpose of the present invention to improve accuracy, remove most human judgement of measurement results, allow for measurements that are impossible to perform mechanically, and provide more convenient, faster measurements than conventional measurement devices.

In accordance with the present invention, a modular measurement device is provided for quickly and accurately performing non-contact measurements of various objects at different locations within a commercial or residential work area. The modular measurement device generally includes a laser base that is operable to project light onto a measured object; and a portable measurement module adapted to receive light reflected from a surface of the measured object and operable to determine dimensional measurement data for the measured object, where the portable measurement module is configured to releasably couple to the laser base. The operational components of the measurement device are easily partitioned between the portable measurement module and the laser base. In this way, a single portable measurement module having more expensive operational components may be used with different, less expensive laser bases, where each laser base may be adapted for a different application.

In one aspect of the present invention, the modular measurement device may be integrated with various power tool equipment, such as table saws, miter saws, radial arm saws, band saws, the drill presses, routers, shapers, planers, joiners and lathe.

For a more complete understanding of the invention, its objects and advantages, reference may be had to the following specification and to the accompanying drawings.

BRIEF DESCRIPTION OF THE DRAWINGS

FIGS. 18–20 illustrate various exemplary applications of the modular non-contact measurement device to different power tool assemblies in accordance with the present invention.

DETAILED DESCRIPTION OF THE PREFERRED EMBODIMENTS

Figure 1:
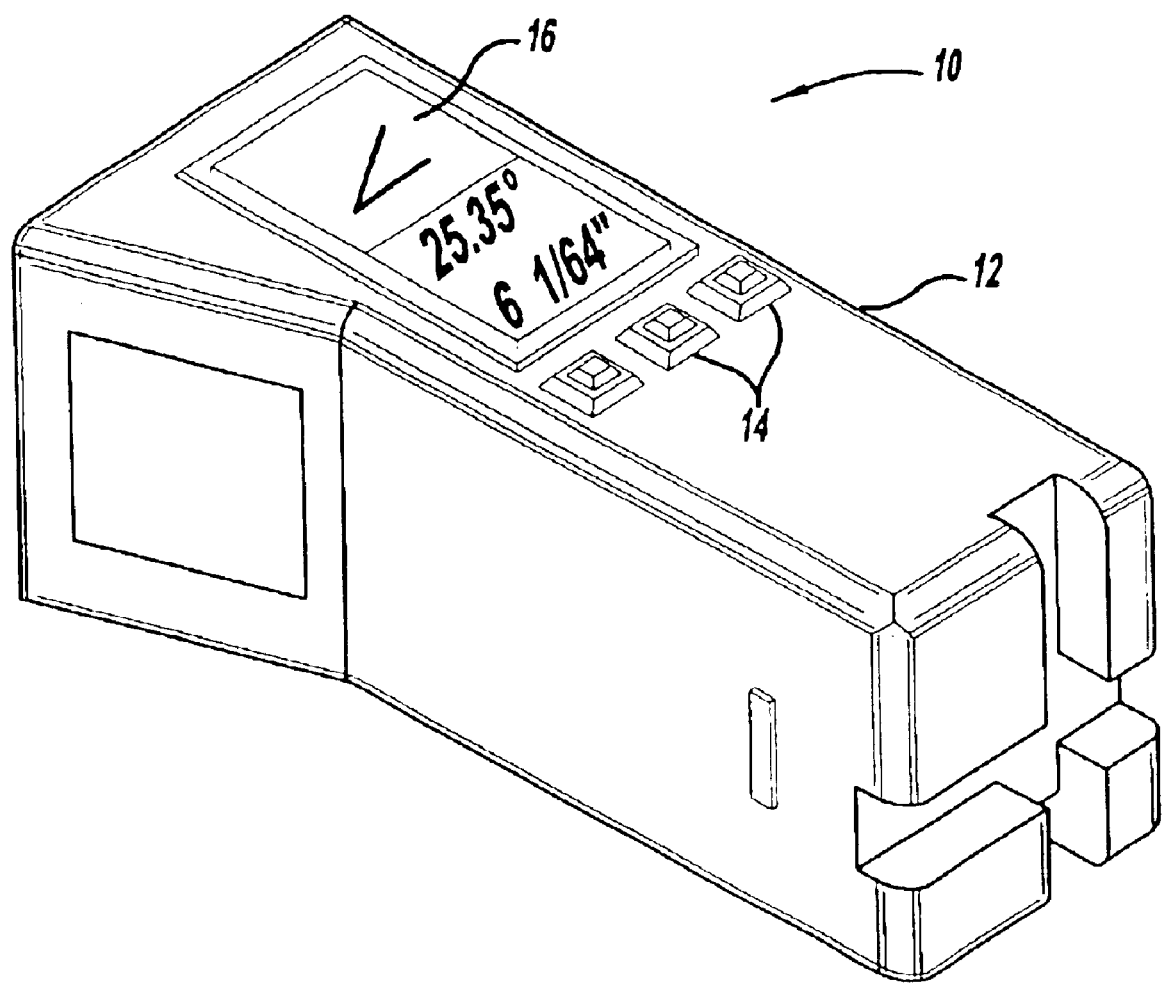
FIG. 1 is a perspective view of a portable non-contact measurement device in accordance with the present invention.

An exemplary portable measurement device 10 in accordance with the present invention is shown in FIG. 1. The portable measurement device 10 is housed in a housing assembly 12 which is sized to be hand-held by a user. It should be appreciated that housing assembly 12 may further include other design features (such as a handle or a hand-formed gripping area) that facilitate the portable nature of the measurement device 10. The operation of the measurement device may be controlled via the user interface elements integrated into the housing assembly 12. In this preferred embodiment, one or more push buttons 14 are used to receive input from the user and a display 16 is used to visually output measurement data to the user.

Figure 2:
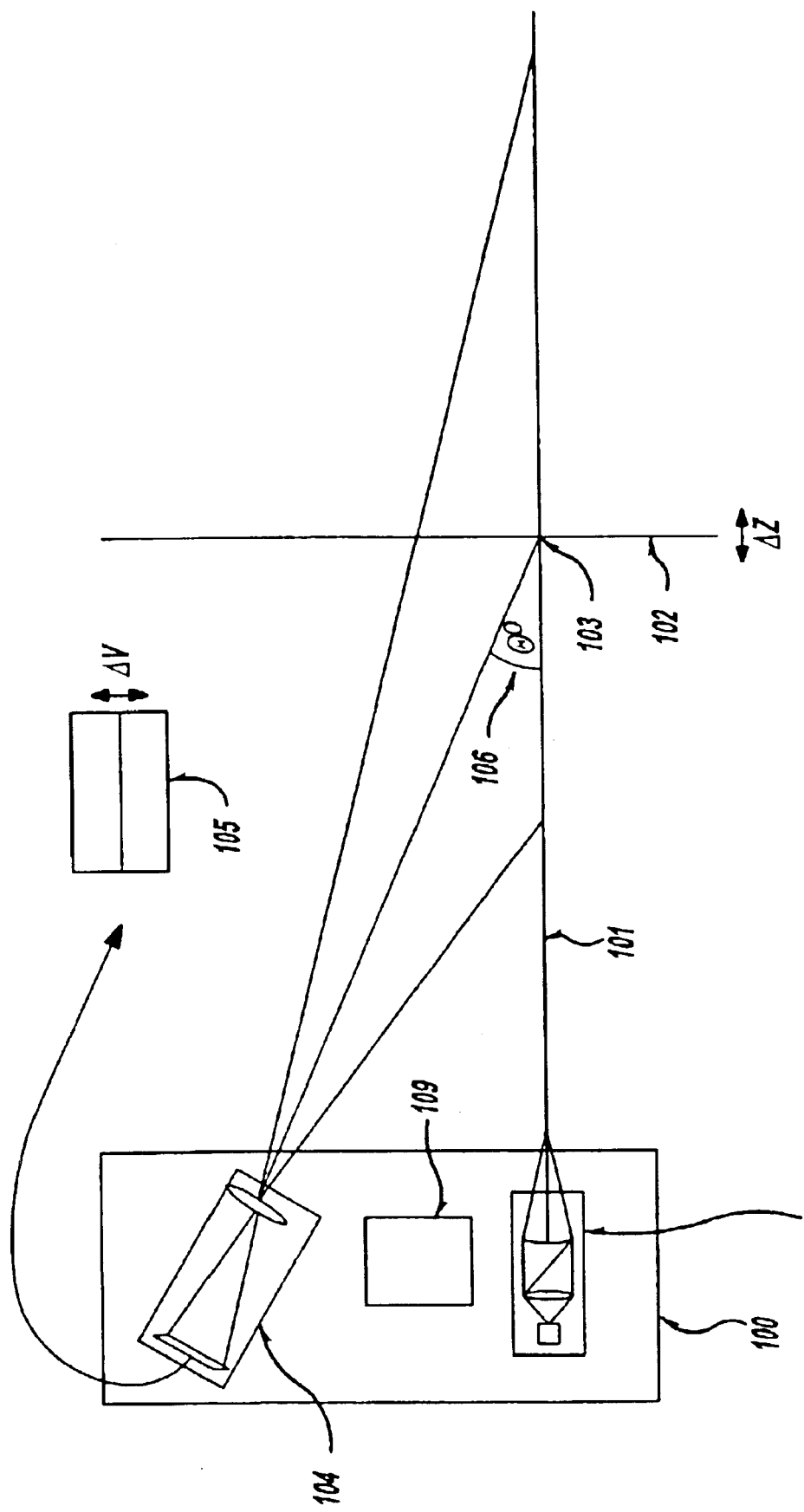
FIG. 2 is a diagram illustrating laser triangulation technology as employed in an exemplary non-contact sensor.

Referring to FIG. 2, the portable measurement device 10 is based on well known laser triangulation technology heretofore employed in various commercially available non-contact sensors. In general, a non-contact sensor 100 projects one or more planes of laser light 101 towards an object 102. The laser plane 101 is projected by a light source assembly 107 that preferably includes a laser diode, a laser projection lens assembly and accompanying electronics for controlling the light source assembly. The points of intersection of the projected laser plane and the object 103 are then imaged by a electronic camera assembly 104. The electronic camera assembly 104 preferably comprises an imaging array (e.g, CCD or CMOS), a lens assembly, and accompanying electronics for controlling the electronic camera assembly.

The image data for a flat object oriented perpendicular to the laser plane is a nominally straight line as shown in inset 105. Due to the triangular relationship between the light source and the electronic camera assembly, displacement of the object 102 toward or away from the sensor 100 results in the movement of the image data up and down, respectively. The resolution of vertical displacement in the image (V) depends on the thickness of the laser line, the number of pixels in the electronic camera and the overall signal to noise ratio of the imaging system. To improve the accuracy of measurement data, the sensing zone of the sensor may be divided into smaller measurement areas, such that a different imaging array captures light from each measurement area. The triangulation angle (at the center of the field) is typically between 15 degrees and 25 degrees. For further details regarding an exemplary non-contact sensor, reference may be had to the TriCam sensors manufactured by Perceptron. Inc. of Plymouth, Mich.

Figure 3:
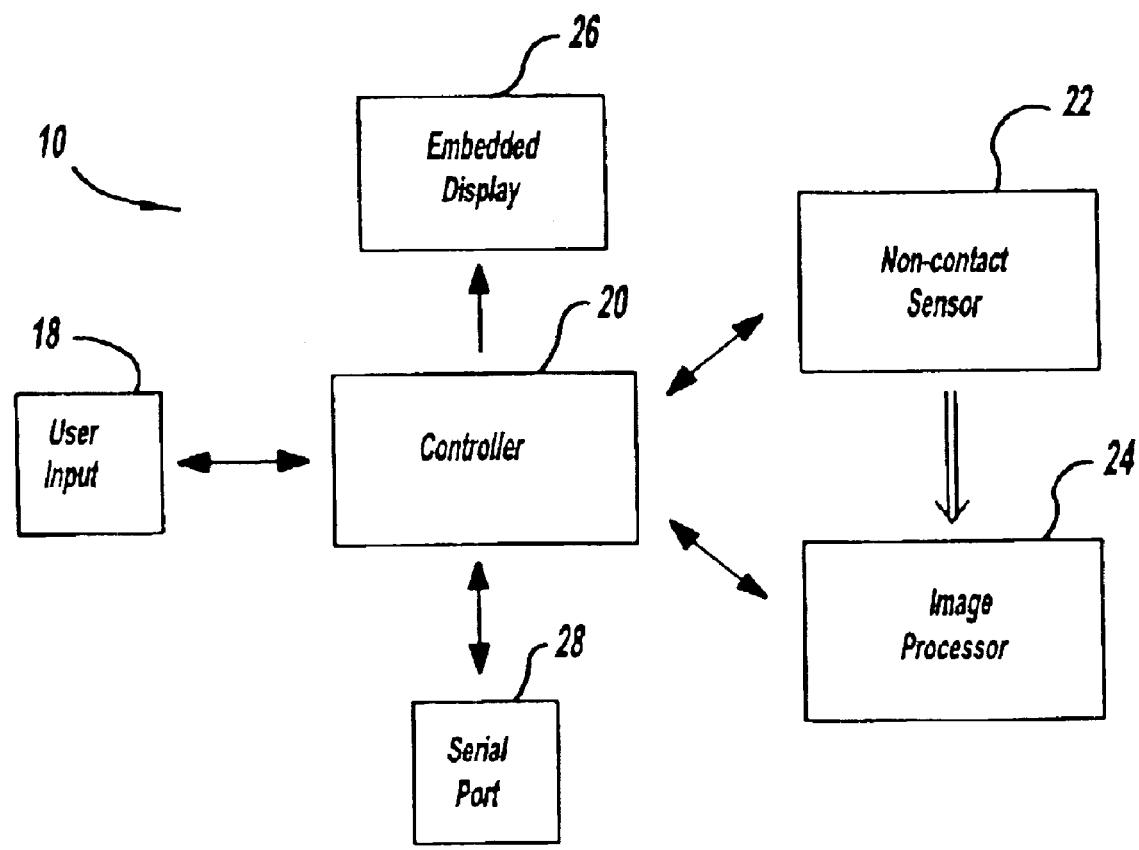
FIG. 3 is a block diagram depicting the primary components of the non-contact measurement device in accordance with the present invention.

FIG. 3 illustrates the basic components associated with the portable measurement device 10 of the present invention. The portable measurement device 10 generally includes one or more user input elements 18, a controller 20, a non-contact sensor 22, an image processor 24, a display 26, and a power supply (e.g., a battery). It should be appreciated that one or more subcomponents from an exemplary non-contact sensor (rather than a complete sensor unit) may be incorporated into the portable measurement device 10.

One or more user input elements 18 receive input commands from a user of the measurement device. Input commands may include power on/off commands, measurement trigger commands, measurement mode commands, measurement origin offset commands, etc. The input commands are in turn communicated to the controller 20. The user input elements 18 may assume a variety of forms, including push buttons, radial knobs, a touch screen display, or a combination thereof.

The controller 20 controls the overall operation of the measurement device 10. For instance, the controller 20 interfaces with the non-contact sensor 22 to facilitate acquisition of image data for a measured object. In particular, the controller 20 may issue power on/off commands and/or power setting commands to the light source associated with the non-contact sensor 22. The controller 20 may also issue power on/off commands, measurement trigger commands, exposure commands, resolution setting commands, and/or data transfer commands to the imaging array associated with non-contact sensor 22.

Furthermore, the controller 20 interfaces with the image processor 24. The image processor 24 is adapted to retrieve image data from the non-contact sensor 22 and to convert the image data into measurement data for the measured object. The image processor 24 includes one or more algorithms for converting the raw image data into measurement data as is well known in the art. It is envisioned that a different algorithm may be used depending on the type of measurement being taken (e.g., width of an object, angle between two adjacent surface, etc.) by the device.

A display 26 embedded into the housing of the measurement device is used to visually display the measurement data to the user. To do so, the display is adapted to receive measurement data from the image processor 24. In addition, the display 26 may further receive input commands from the controller as to how the dimensional data is to be displayed to the user. The display 26 may be graphic or numeric and assume a variety of forms, such as an LED or a LCD.

The portable measurement device 10 may optionally include an external communication port 28 (e.g., RS-322, USB, wireless port, etc). It is envisioned that the controller 20 may transmit measurement data via the communication port 28 to an external source. In addition, the controller 20 may also receive remote activation commands or updates to the software algorithms via the communication port 28 from an external source.

Figure 4A:
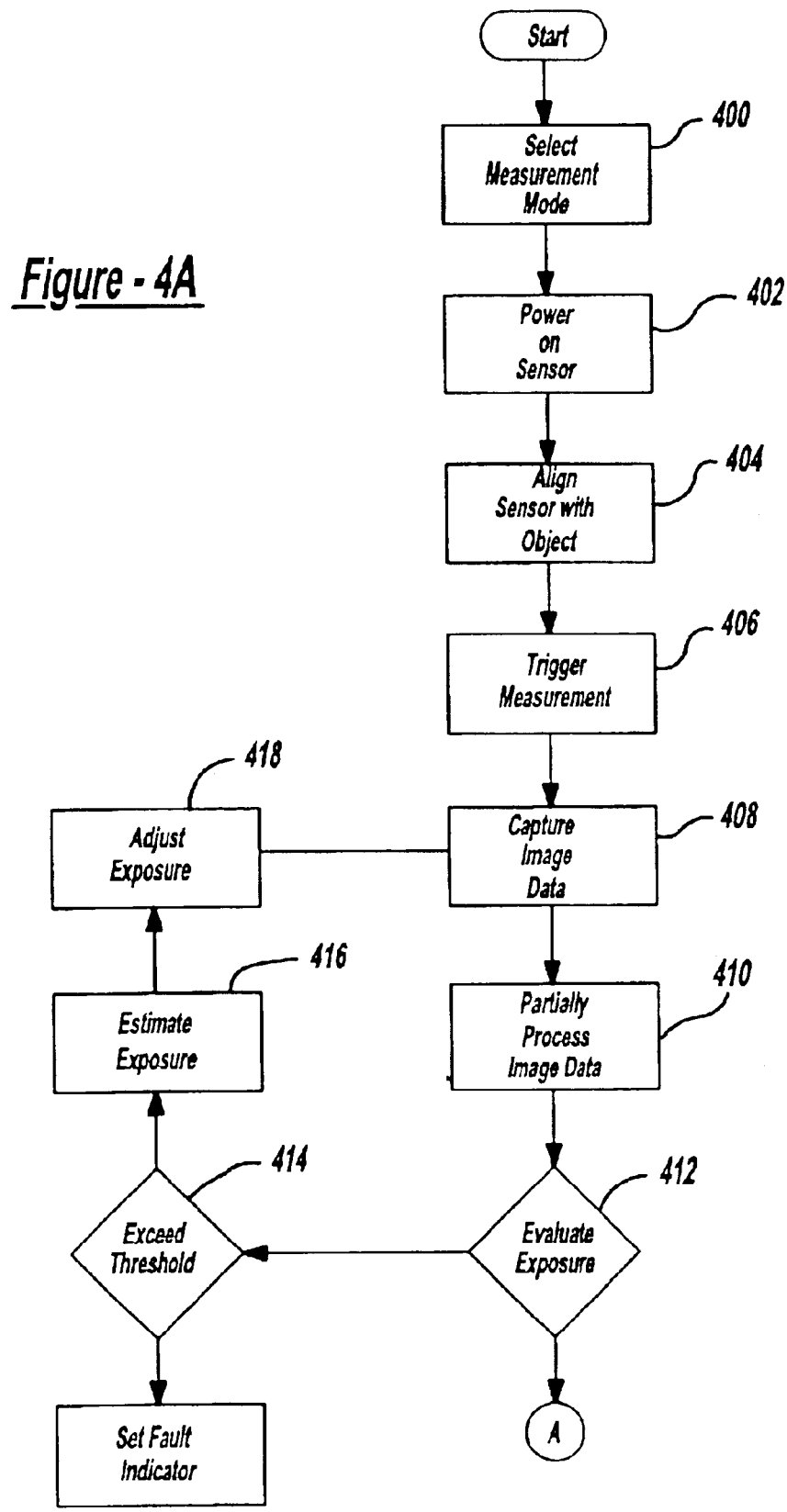
FIGS. 4A and 4B are flow charts depicting an exemplary measurement cycle for the non-contact measurement device in accordance with the present invention.
Figure 4B:
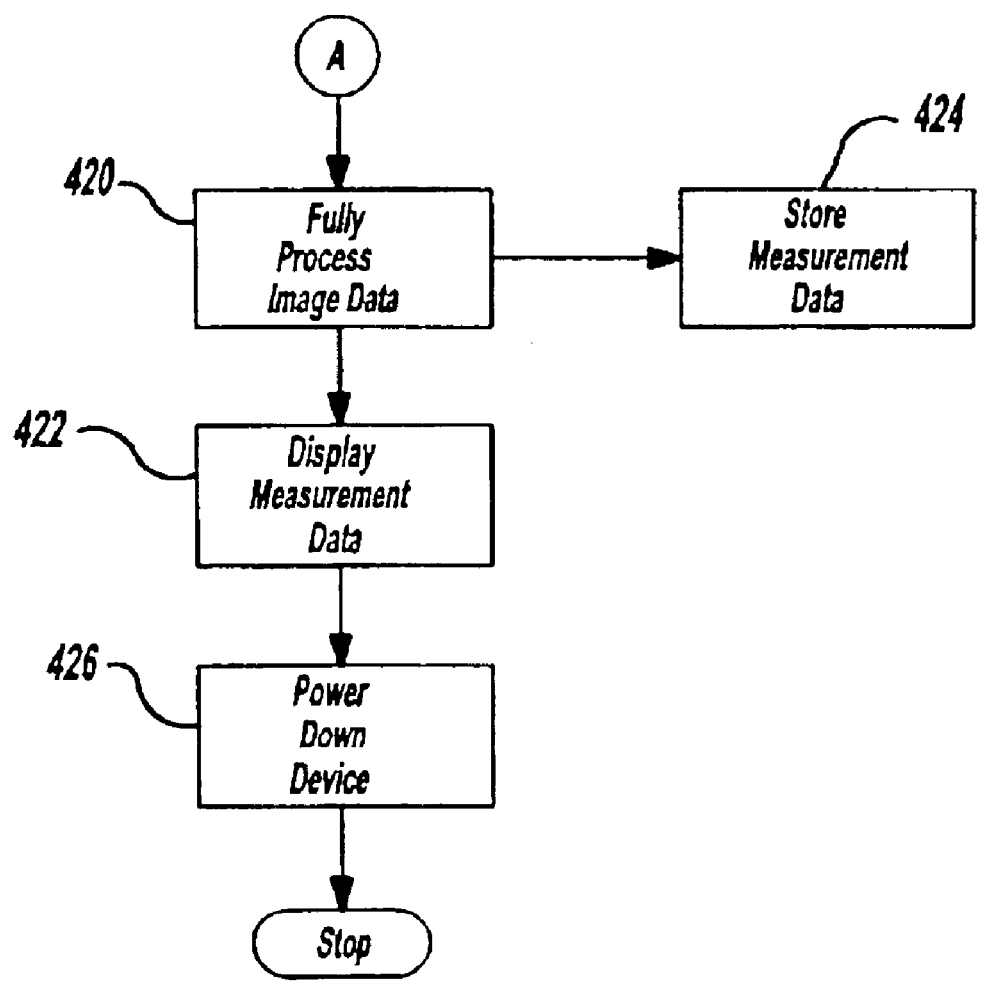

A typical measurement cycle for the above-described measurement device 10 is depicted in FIG. 4. Initially, device preparation steps are performed by the user. In step 400, the user selects the measurement mode for the device. The measurement mode indicates the type of measurement that is to be taken (e.g., width of an object, angle between two adjacent surfaces, etc.) by the device. As will be apparent to one skilled in the art, the measurement mode determines the algorithm used to convert the image data into measurement data as well as dictates the how the measurement data will be displayed to the user. In addition, the sensor is powered on by the user in step 402. As a result, the measure laser plane and possibly an auxiliary alignment beam are projected from the measurement device 10.

Next, the user directs the measurement device towards the object to be measured in step 404. In particular, the measurement device is positioned such that the measured object falls within the field of view of the non-contact sensor. It is envisioned that an auxiliary laser light source may be used to assist the user in localizing the measured object within the center of the field of view of the sensor.

The user can then trigger a measurement as shown in step 406. By activating the applicable user input element, a trigger command is generated and sent to the controller. In response to the trigger command, the controller sets the camera exposure to some predefined value and then commands the camera to capture image data at step 408. It is also envisioned that the user may set the camera exposure via the user input elements as part of the above-described device preparation process.

In a preferred embodiment of the present invention, the image data may be partially processed to determine correctness of the exposure setting as shown in step 410. One skilled the art will readily recognize that the exposure setting is dependent on various factors such as the angle of incidence and the material of the measured object. The adequacy of the exposure is evaluated in step 412. If the exposure setting for the camera is not correct, the controller may estimate the correct setting at step 416 and adjust the exposure setting at step 418 before commanding the camera to take another image. This process may be repeated until an accurate exposure setting cycle is obtained. It is envisioned that no more than two cycles would be needed in a typical application in order to achieve an accurate exposure setting. Moreover, it is expected that the time for this iterative process is much less than a second. In the event that no exposure setting is deemed to be adequate after some predefined number of iterations or some predefined threshold time, then a fault indicator is provided to the user.

If the exposure setting is deemed to be acceptable, then the image data is fully processed in step 420. To do so, the image data is transferred from the sensor to the image processor. The image processor in turn converts the image data to measurement data using the applicable algorithm. In step 422, the measurement data is visually displayed to the user. In addition to the measurement data, a visual indicator of the measurement mode as well as a visual representation of the measured object may also be displayed to the user. In step 424, the measurement data may also be stored for subsequent processing in a memory space residing on the device. The above-described measurement cycle (or some portion thereof) may be repeated to obtain additional measurement data.

Lastly, the measurement device may be powered down upon completion of the measurement cycle at step 426. After some predefined time period of inactivity, it is envisioned that the sensor will power down to a standby mode. In the standby mode, the display is still readable until the measurement device is completely turned off. It is to be understood that only the relevant steps of the measurement cycle are discussed above, but that other software-implemented instructions may be needed to control and manage the overall operation of the portable measurement device.

Figure 5A:
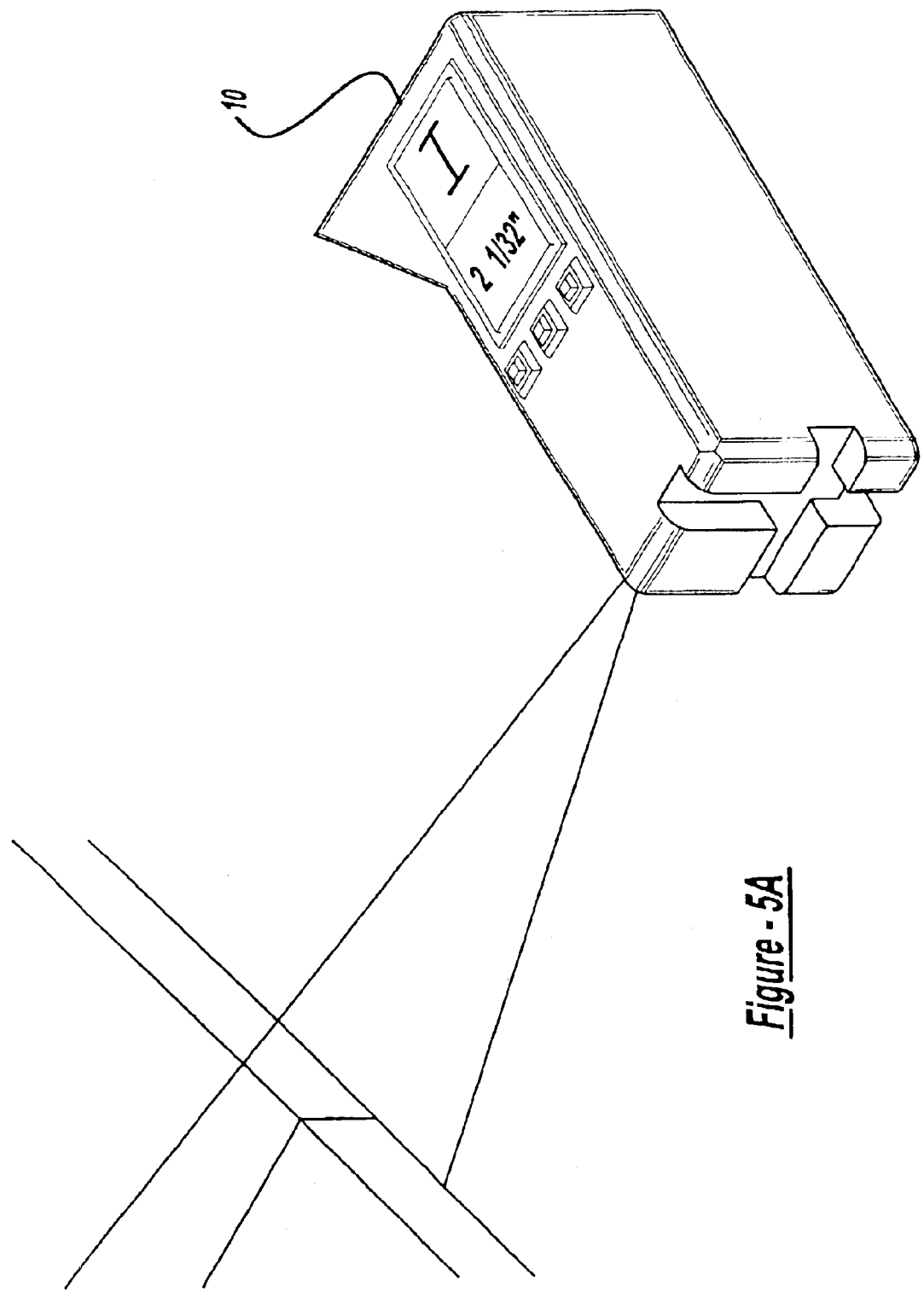
FIGS. 5A and 5B illustrate a first preferred application for the non-contact measurement device in accordance with the present invention.
Figure 5B:
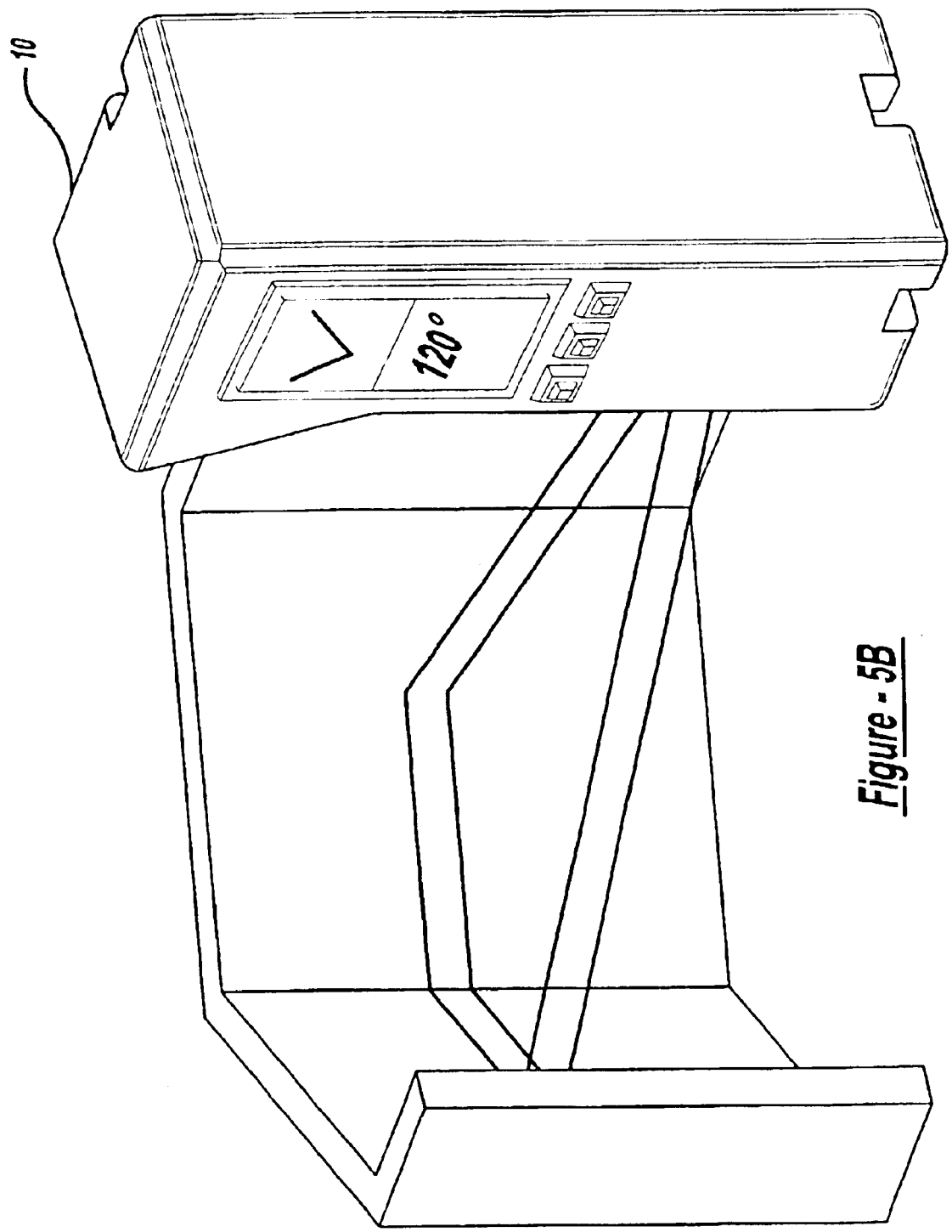

FIGS. 5A and 5B illustrate a first preferred application for the portable measurement device 10 of the present invention. Referring to FIG. 5A, the portable measurement device 10 is hand-held to measure various dimensional or angular attributes of a measured object. Measurement data for the object may include (but is not limited to) the angle between any two surfaces, compound angle for any two surfaces, the height of an object, the width of an object, and the diameter of an object. In this instance, the measurement device 10 is measuring the height of a board. In another instance, the measurement device 10 may measure the angle between two surface as shown in FIG. 5B. It is envisioned that many other types of dimensional or angular measurements (e.g., width and depth of slots or holes in an object) are also within the scope of the present invention.

A hand-held measurement device preferably uses at least two projected laser planes to improve the accuracy of measurement data. One skilled in the art will readily recognize that the second laser plane is used to eliminate error caused by a non-normal incident angle of the projected laser plane with the surface of the measured object. In this way, the measurement device need not be perpendicular to the measure object in order to obtain accurate measurement data. It should also be appreciated that the portable nature of the measurement device 10 allows it to be placed on any flat surface (e.g., on a workbench or on the floor), mounted in a stand, or positioned in other areas of a typical work environment, such that the housing assembly of the device serves as a reference plane for the measurement data. It these instances, the measurement device may be further configured to allow the operator to select the zero position for the measurement to align with either the face of the sensor or the abutted surface of the device.

To facilitate repetitive measurements, the measurement device may also include a recall setting. In the recall measurement mode, the measurement device is used to determine if objects have similar measures. Upon completion of a given measurement, the operator may initiate the recall measurement mode which in turn stores off the most recent measurement data. For subsequent measurements, the measurement device will provide an audible indicator if the current measurement is the same (within some predefined error margin) as the stored measurement data. For certain measurement types, such as distance to the measured object, the reported measurement data may be updated in real-time as the measurement device is moved closer or further from the measured object. In these instances, the audible indicator will be activated when the measured distance corresponds to the stored measurement data. It is envisioned that other types of measurement indicators, such as a visual slide bar, may also be used to assist the operator.

Figure 6:
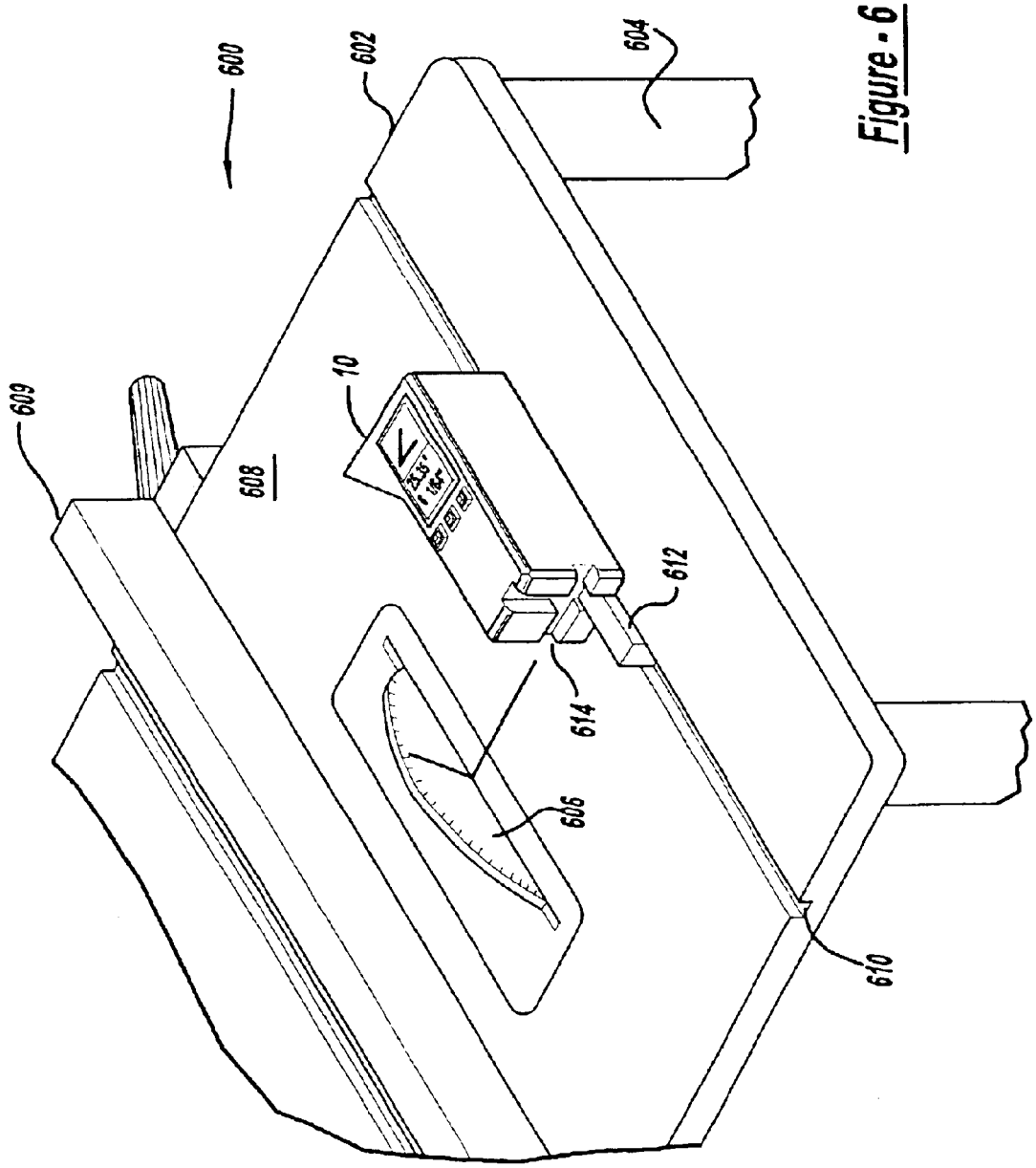
FIG. 6 illustrates a second preferred application for the non-contact measurement device in accordance with the present invention.

FIG. 6 illustrates a second preferred application for the portable measurement device 10 of the present invention. In this instance, the measurement device is integrated with a power tool assembly. While the following description is provided with reference to a table saw, it is readily understood that the broader aspects of the present invention are applicable to other types of power tool assemblies, such as radial arm saws, band saws, drill presses, router, shapers, planers, joiners, and lathes.

The power tool assembly 600 includes a work table 602 adapted to support at least one power tool in a proximate location to the work table, and a support structure 604 for supporting the work table 602 in an elevated position above a substantially planar surface, such as the surface of a workbench or the floor. For instance, a saw blade 606 extends through a working surface 608 of the table as shown in FIG. 6. The power tool assembly 600 may further include a movable guide fence 609 as is well known in the art.

The portable measurement device 10 is slidably mounted and movable along the surface of the working surface of table as shown in FIG. 6. In this preferred embodiment, a slide slot 610 is formed into the working surface of the table to facilitate the movement of the measurement device along the work table 602. A slide member 612 is disposed into one of the grooves 614 which are formed in the housing assembly of the measurement device 10. The slide member 612 of the measurement device in turn slidably engages the slide slot 610 of the working table 602. In this way, the measurement device 10 is slidably movable along the length of the work table. As will be apparent to one skilled in the art, other known techniques may be used to mounting the measurement device to the work table. Rather than a detachable accessory, the measurement device may alternatively be part of or incorporated into the structure of the power tool assembly.

The measurement device 10 may determine various measurements associated with the power tool support assembly and the operation of an accompanying power tool. It should be appreciated that while two or more projected laser planes may be used to improve the accuracy of measurement data, only a single projected laser plane is needed in this application. In the case of a table saw, types of applicable measurements may include (but is not limited to) the angle of the saw blade relative to the working surface, the height of the saw blade, the saw blade run out, the angle of the guide fence relative to the saw blade or to the working surface, the distance between the guide fence and the saw blade, and the height of a workpiece on the work table. One skilled in the art will readily recognize that the types of selectable measurement modes may be dependent on the type and configuration of the power tool assembly. Therefore, it is envisioned that other types of measurements are also within the scope of the present invention.

Figure 7B:
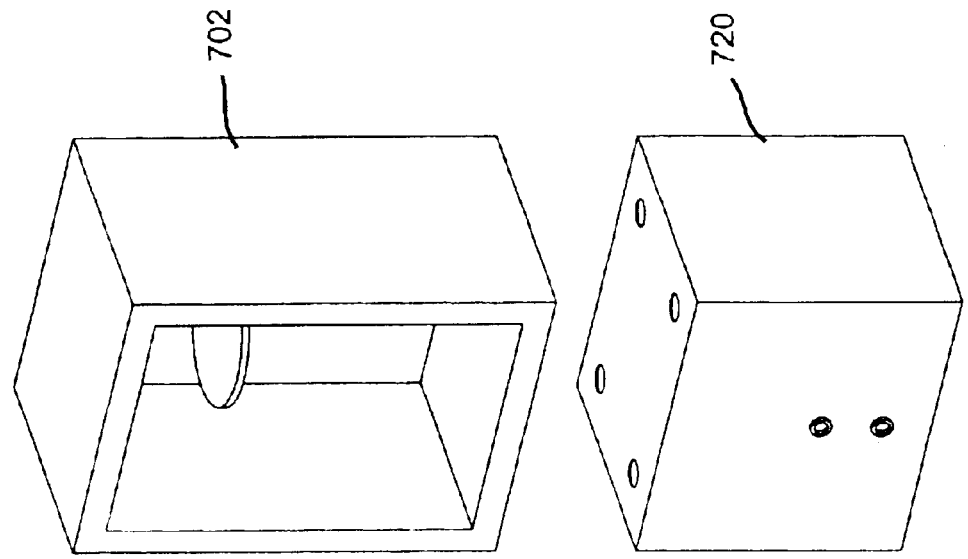
FIGS. 7A and 7B are diagrams illustrating an exemplary modular non-contact measurement device in accordance with another aspect of the present invention.
Figure 7A:
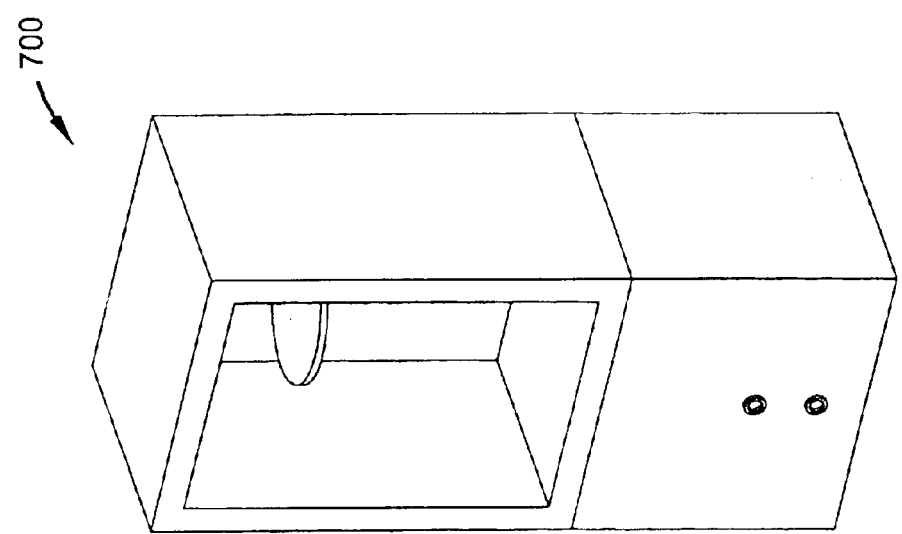

In another aspect of the present invention, a modular non-contact measurement device is provided for various measurement applications. The modular non-contact measurement device 700 is comprised of a portable measurement module 702 and a laser base 720 as shown in FIG. 7. As further described below, the operational components of the measurement device 700 are partitioned between the portable measurement module 702 and the laser base 720. In this way, a single portable measurement module having more expensive operational components may be used with different laser bases, such that each laser base may be adapted for a different measurement application.

Figure 8:
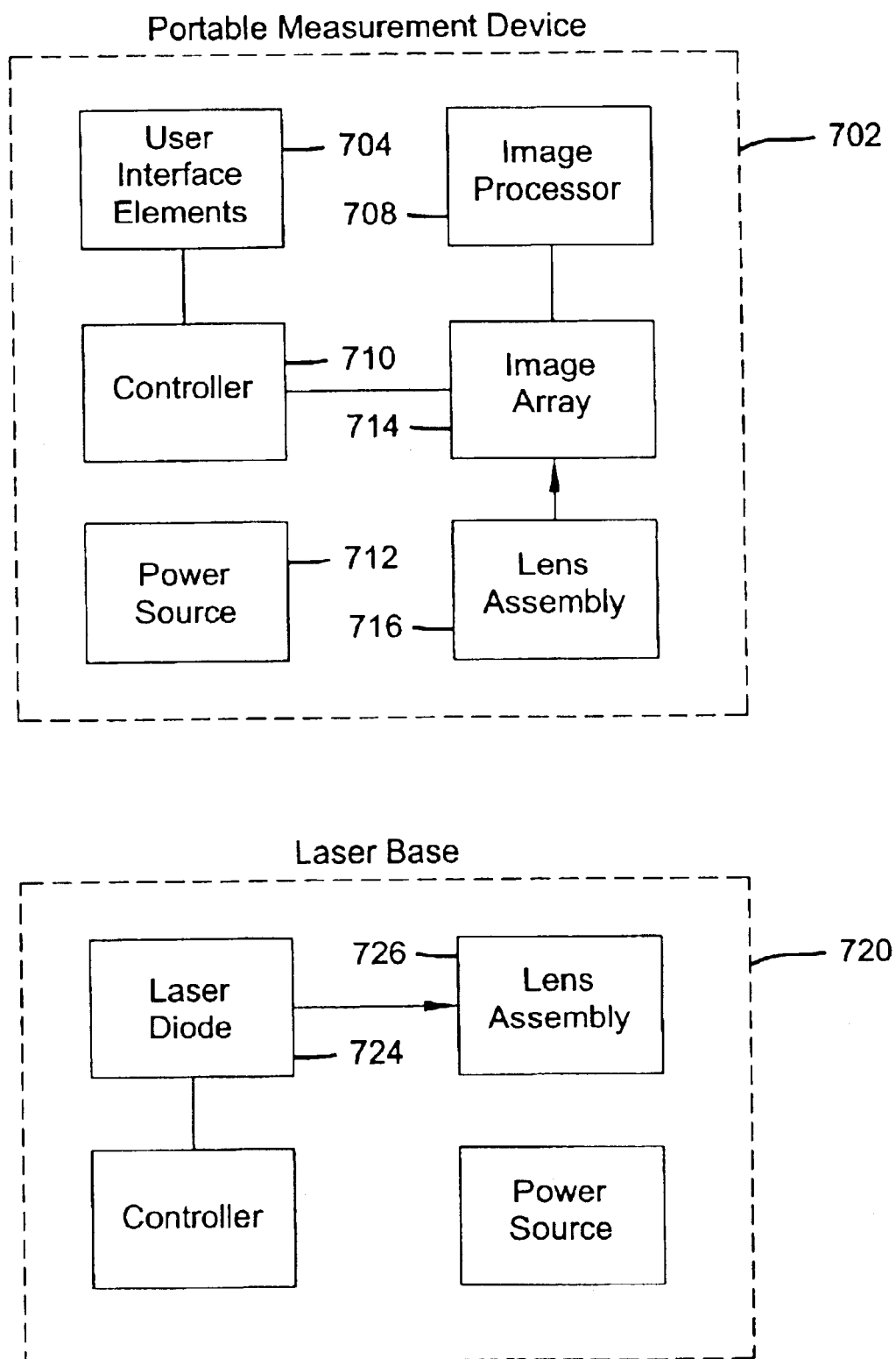
FIG. 8 is a block diagram depicting the primary components of the modular non-contact measurement device of the present invention.

Referring to FIG. 8, the portable measurement module 702 is primarily comprised of one or more user interface elements 704, a sensing assembly 706, an image processor 708, a controller 710, and a power source 712. The sensing assembly 706 is further defined as an imaging array 714, an imaging lens assembly 716, and accompanying electronics for controlling the sensing assembly. Each of these various components are integrated into a housing assembly.

On the other hand, the laser base is operable to project light onto the surface of the measured object. Thus, the laser base 720 is primarily comprised of a light source assembly 722. The light source assembly is further defined as a laser diode 724, a projection lens assembly 726, and accompanying electronics for controlling the light source assembly. Although not necessary, the laser base 720 may optionally include a controller and/or a power source In operation, the laser base 720 projects light onto the surface of a measured object. In a preferred embodiment, the laser base 720 project two beams of lights light onto the measured object. In an alternative embodiment, the laser base 720 may be configured to project a plane of structured light onto the measured object. In this embodiment, it is readily understood that a two-dimensional imaging array 714 is need to receive the reflected light.

The portable measurement module 702 in turn receives light reflected from the surface of the measured object and determines dimensional measurement data for the measured object. During operation, it is readily understood that to employ triangulation principles the portable measurement module must be in a known fixed relationship with the laser base; otherwise the operational components associated with the portable measurement module 702 and the laser base 720 function as set forth above.

An operational measurement device is formed when the portable measurement module 702 is coupled to the laser base 720. In a preferred embodiment, electrical mating contacts are used to magnetically couple the portable measurement module 702 to the laser base 720. A first set of mating contacts 732 is formed on a bottom surface of the portable measurement module 702; whereas a second set of mating contacts 734 is formed on a top surface of the laser base 720. At least one of the sets of mating contacts exhibits a magnetic property, thereby enabling a magnetic coupling between the portable measurement module 702 and the laser base 720. It is readily understood that other techniques for releasably coupling the portable measurement module 702 to the laser baser 720 are also within the broader aspects of the present invention.

The electrical mating contacts also provides an electrical connection between the portable measurement module 702 and the laser base 720. As noted above, a power source 712 may be embedded or otherwise associated with the portable measurement module 702. The laser base 720 is adapted to receive electrical power from the power source via the electrical mating contacts when the portable measurement device is coupled to the laser base. The electrical power received from the power source may in turn be used to power the light source assembly residing in the laser base 720.

Figure 9:
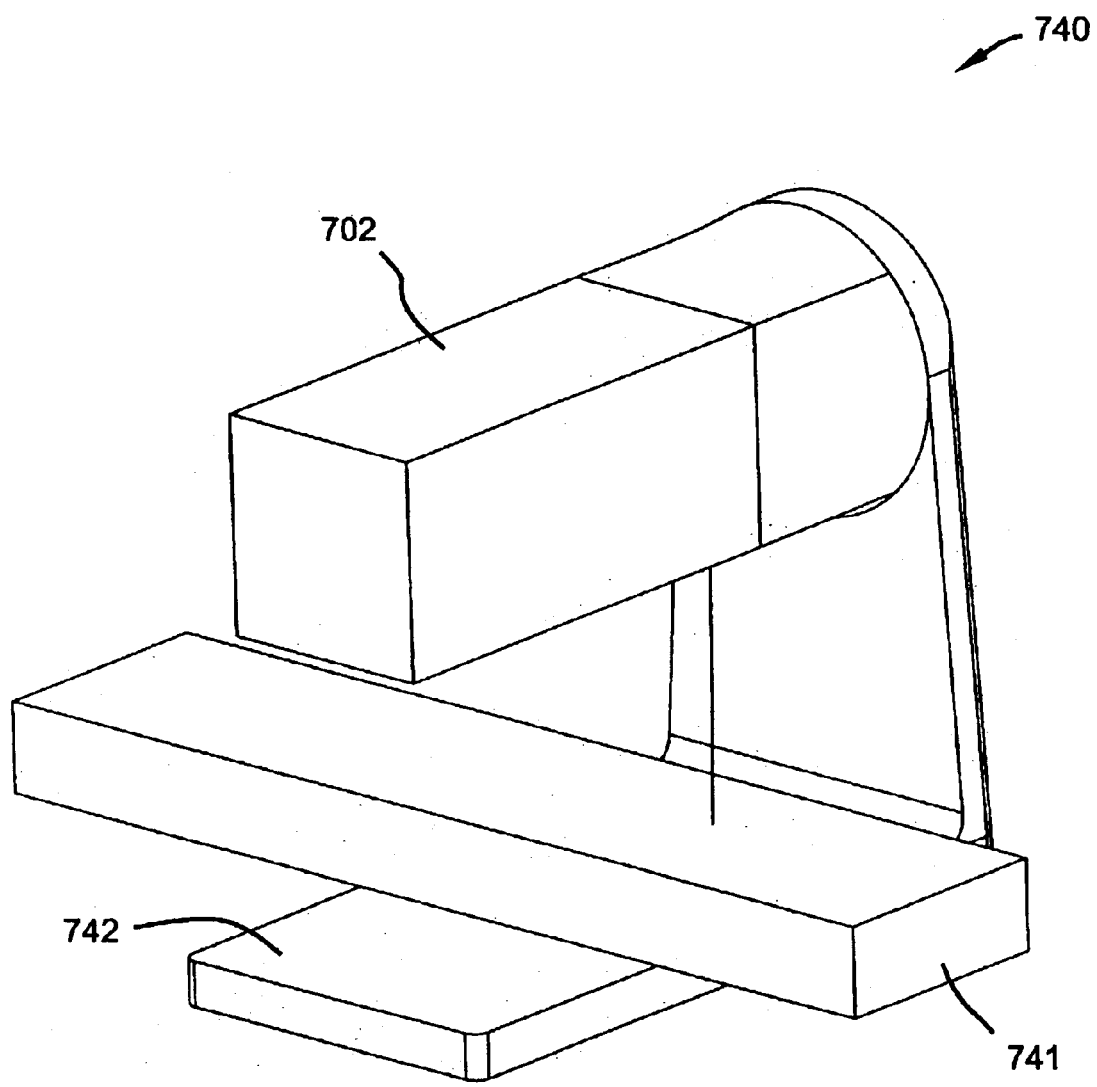
FIG. 9 is a diagram illustrating the portable measurement module coupled to a charging base in accordance with the present invention.

To charge the power source 712, the portable measurement module 702 may be releasably coupled to a charging base 740 as shown in FIG. 9. When coupled thereto, the power source (e.g., a battery) is charged using techniques well known in the art. It is also envisioned that the charging base 740 may be further configured to take non-contact measurements. In particular, the charging base 740 may be configured to include the operational components of the laser baser described above, such that the charging base is operable to project light onto the surface of an object 741 placed on a receiving surface 742 of the charging base 740. The portable measurement module 702 should be oriented to receive the light reflected from the measured object. The charging base may optionally include an external communication port (e.g., USB port) for downloading measurement data to an external source.

Figure 10B:
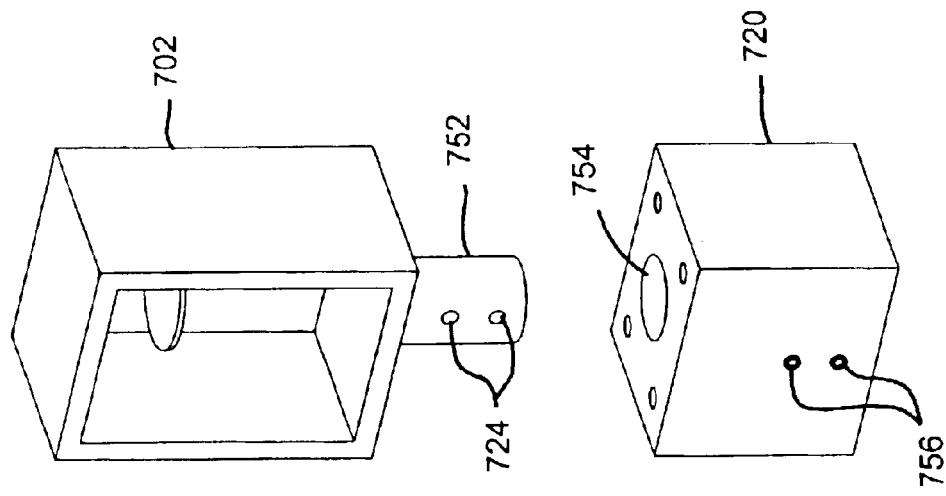
FIGS. 10A and 10B are diagram illustrating a second exemplary modular non-contact measurement device in accordance with another aspect of the present invention.
Figure 10A:
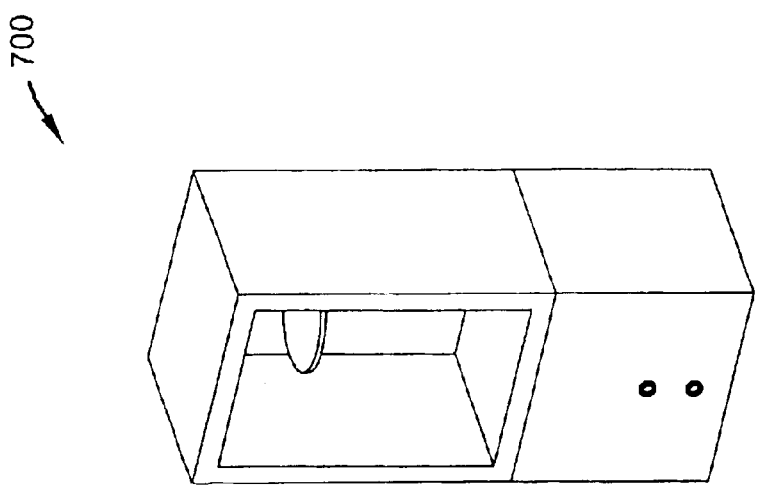

In a second exemplary embodiment, the light source assembly may be integrated into the portable measurement module as shown in Figures 10A and 10B. In this embodiment, the portable measurement module 702 includes a stem portion 752 which extends downwardly from a bottom surface thereof and is configured to house the light source assembly. The laser base is adapted to receive the stem portion 752 into a hole 754 formed in a top surface of the laser base 720. In addition, the laser base 720 includes one or more pass thru holes 756 which align with the laser diodes 724 embedded in the stem portion 752 of the portable measurement module. To releasably couple the modular components, the stem portion 752 of the portable measurement module 702 is inserted into the hole 754 of the laser base 720; otherwise this alternative embodiment operates in the manner discussed above.

Figure 11:
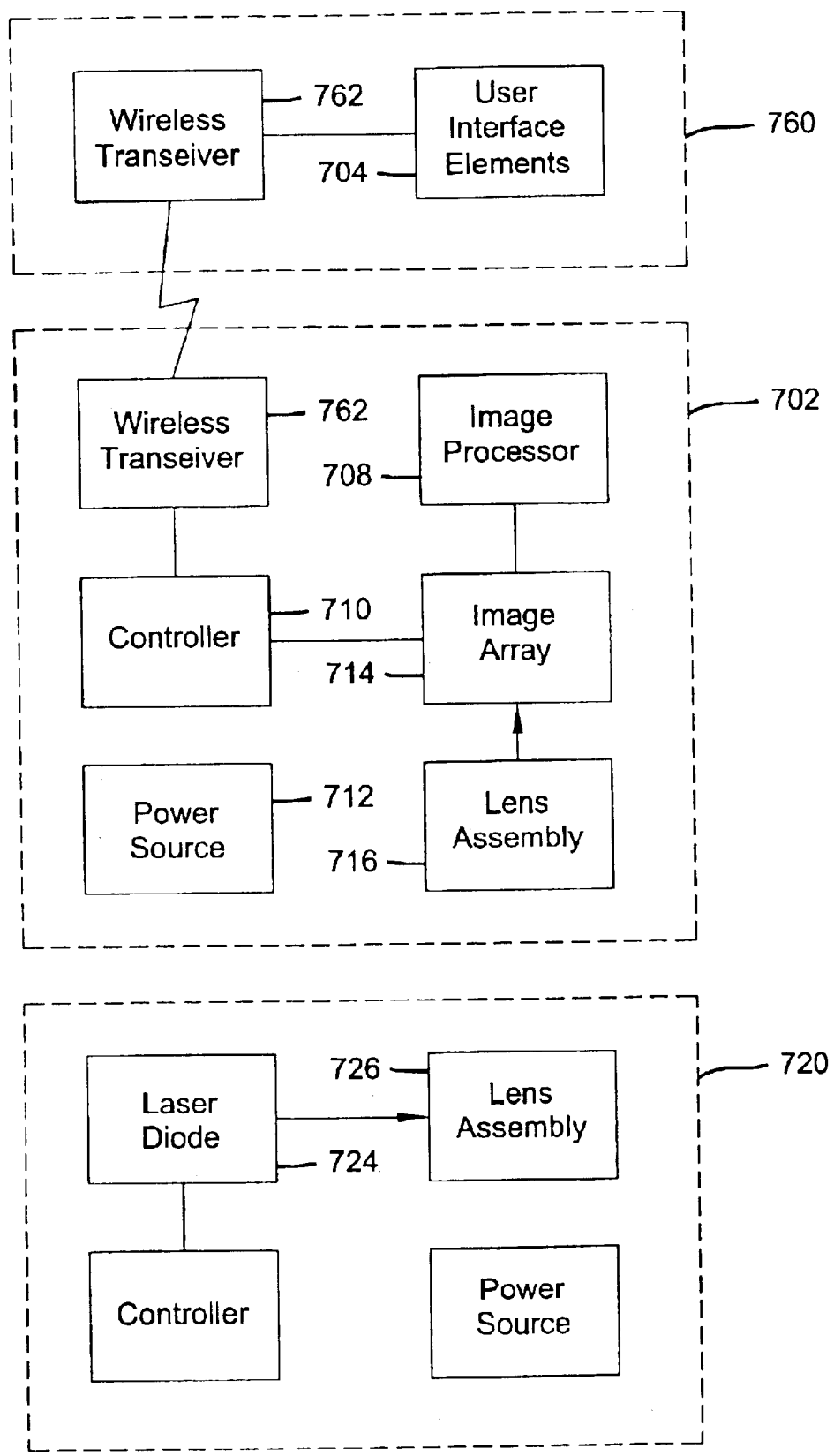
FIG. 11 is a diagram illustrating a third exemplary modular non-contact measurement device in accordance with another aspect of the present invention.

Alternatively, the modular non-contact device may be further segmented as shown in FIG. 11. In this exemplary embodiment, the user interface elements 704, including the display device, are segmented from the portable measurement module 702 to form a third modular component 760. During operation, the third modular component 760 may be magnetically or otherwise coupled to the remainder of the measurement device. However, the third modular component 760 may also be separated from the remainder of the measurement device. For instance, the third modular component 706 may be situated in close proximity to a power tool operator. In this instance, the third modular component 760 is adapted to interface with the controller 710 residing in the portable measurement module 702 over a wireless network using the Bluetooth protocol or some other wireless communication protocol. Thus, the third modular component 760 and the portable measurement module 702 may be further configured to house wireless communications transceivers 762; otherwise this alternative embodiment operates in the manner discussed above.

FIGS. 12–17 illustrate various exemplary applications for the modular measurement device 700. For instance, the modular measurement device 700 may be integrated with a table saw 800. The table saw 800 is generally comprised of a saw blade 802 which extends through a work surface 804 of the table saw. The table saw 800 may further include a movable guide fence 806 as is well known in the art. Preferably, the module measurement device 700 mounts to the guide fence 806 associated with the table saw 800. However, it is envisioned that the measurement device may also be mounted at other locations on or proximate to the table saw.

Figure 12:
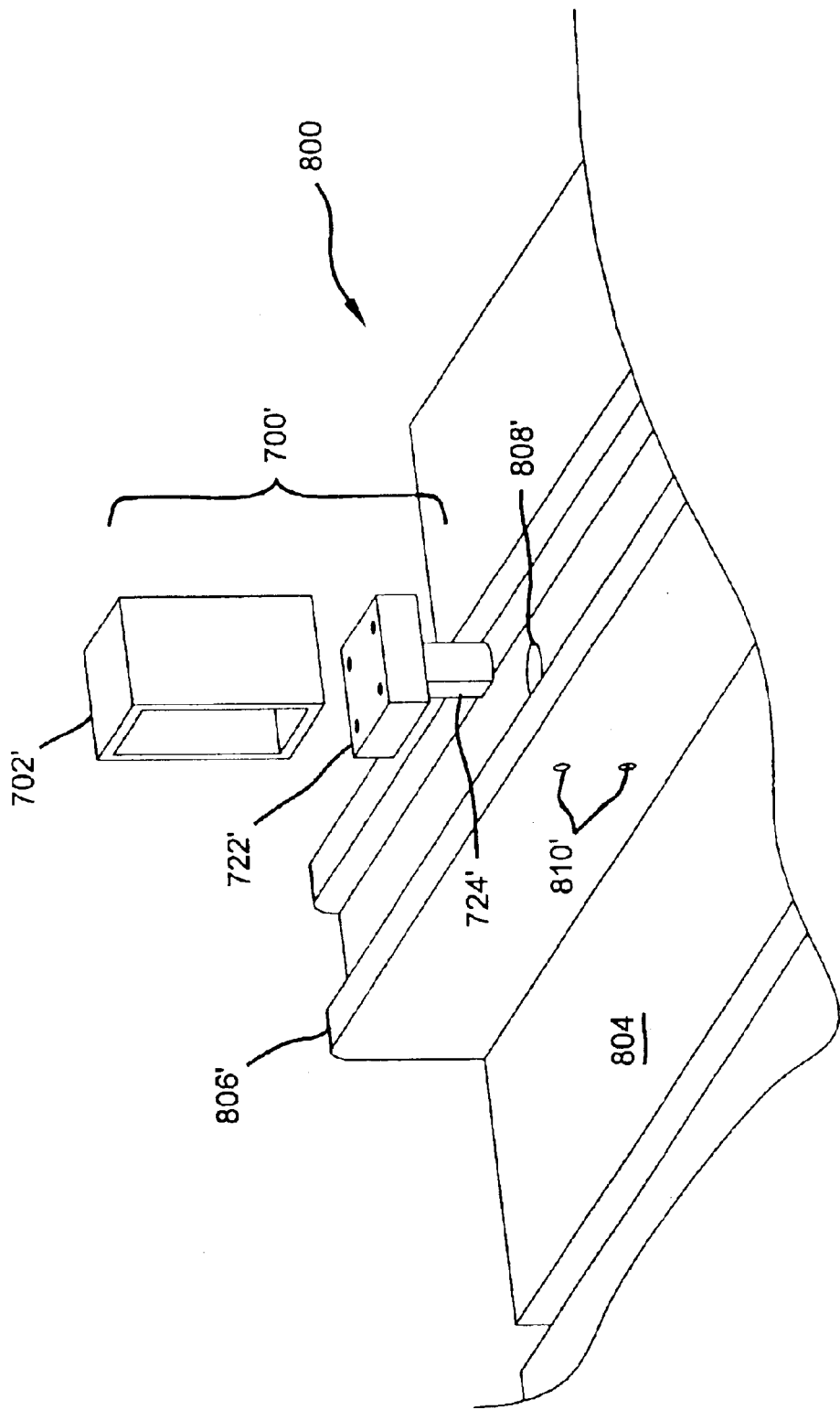
FIGS. 12–14 illustrates an exemplary application of the modular non-contact measurement device to a table saw in accordance with the present invention.
Figure 13:
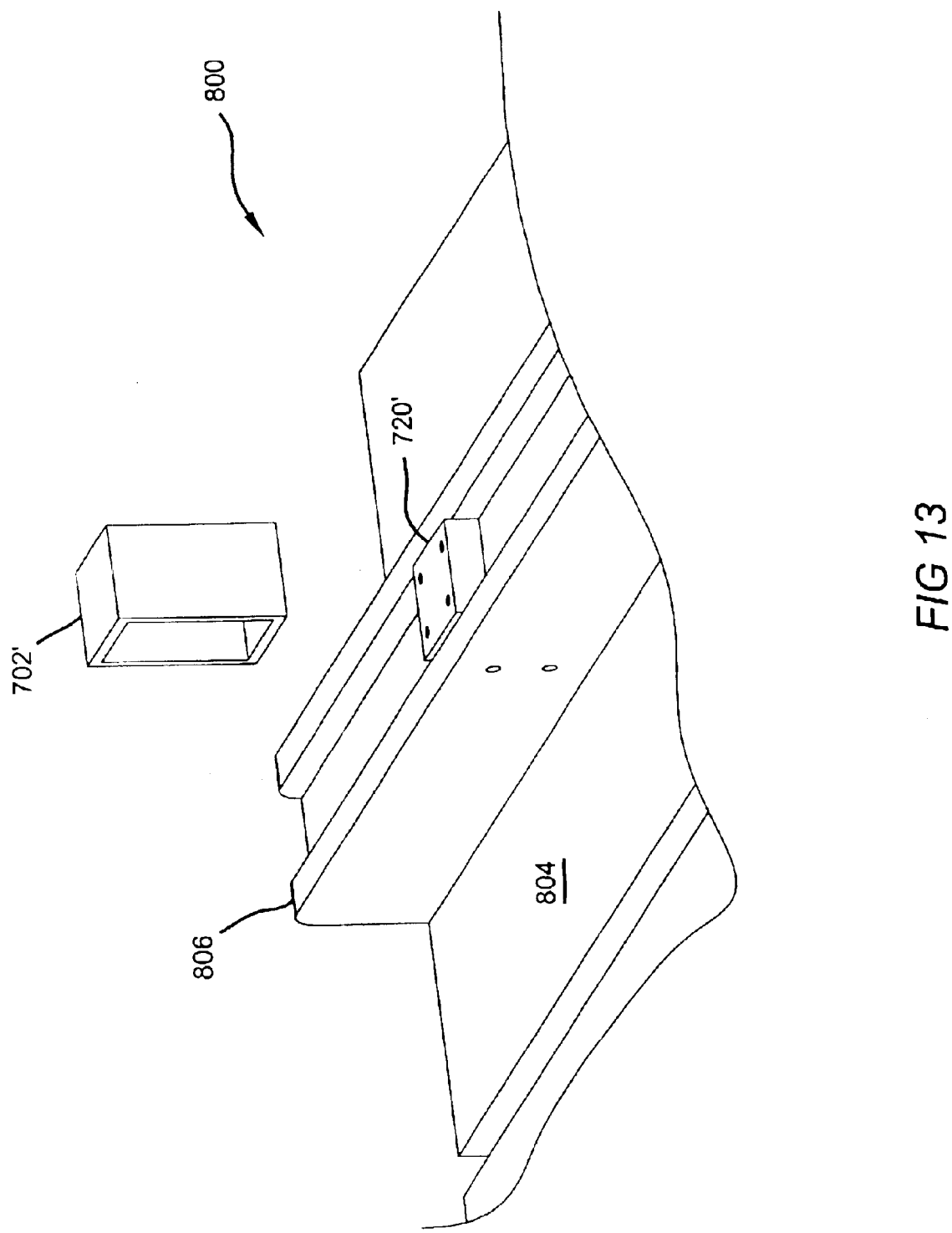
Figure 14:
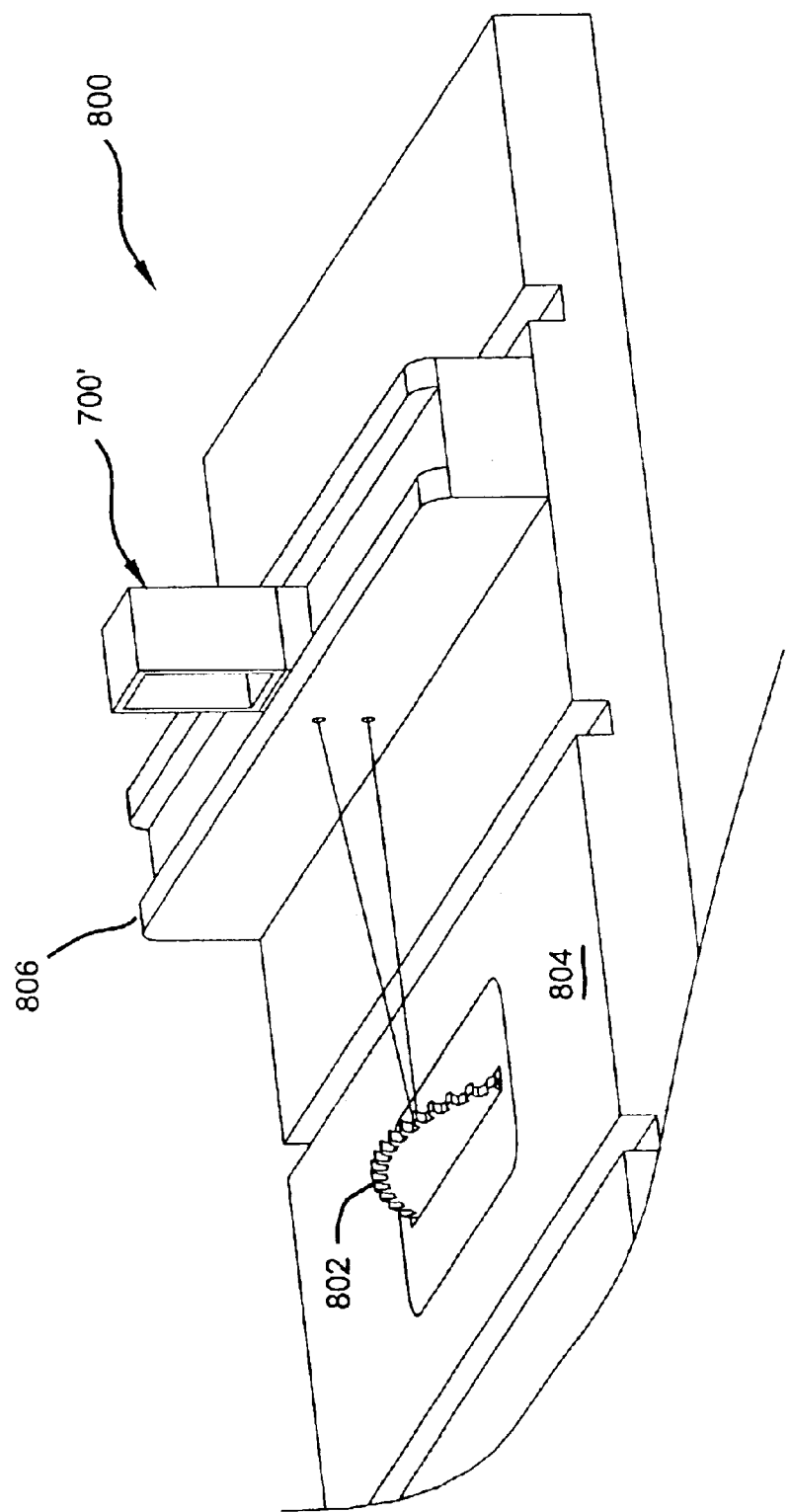

In FIGS. 12–14, the laser base 720' is formed in a T-shape having an engagement portion 722' and a stem portion 724' extending downwardly therefrom. In this exemplary embodiment, a hole 808' sized to receive the stem portion 724' of the laser base 720 is formed into a top surface of the guide fence 806. To couple the laser base 720' to the guide fence 806, the stem portion 722' of the laser base 720' is inserted into the hole 808' in the guide fence 806. Since the laser diode(s) are embedded into the stem portion 722' of the laser base 720', the guide fence 806 may be further modified to include pass-thru holes 810' corresponding to the location of the laser diode(s), thereby enabling light to be projected towards the saw blade 802. The portable measurement module 702' may then be coupled to a top surface of the engagement portion 722' of the laser base 720' to form an operational measurement device 700'.

Figure 15:
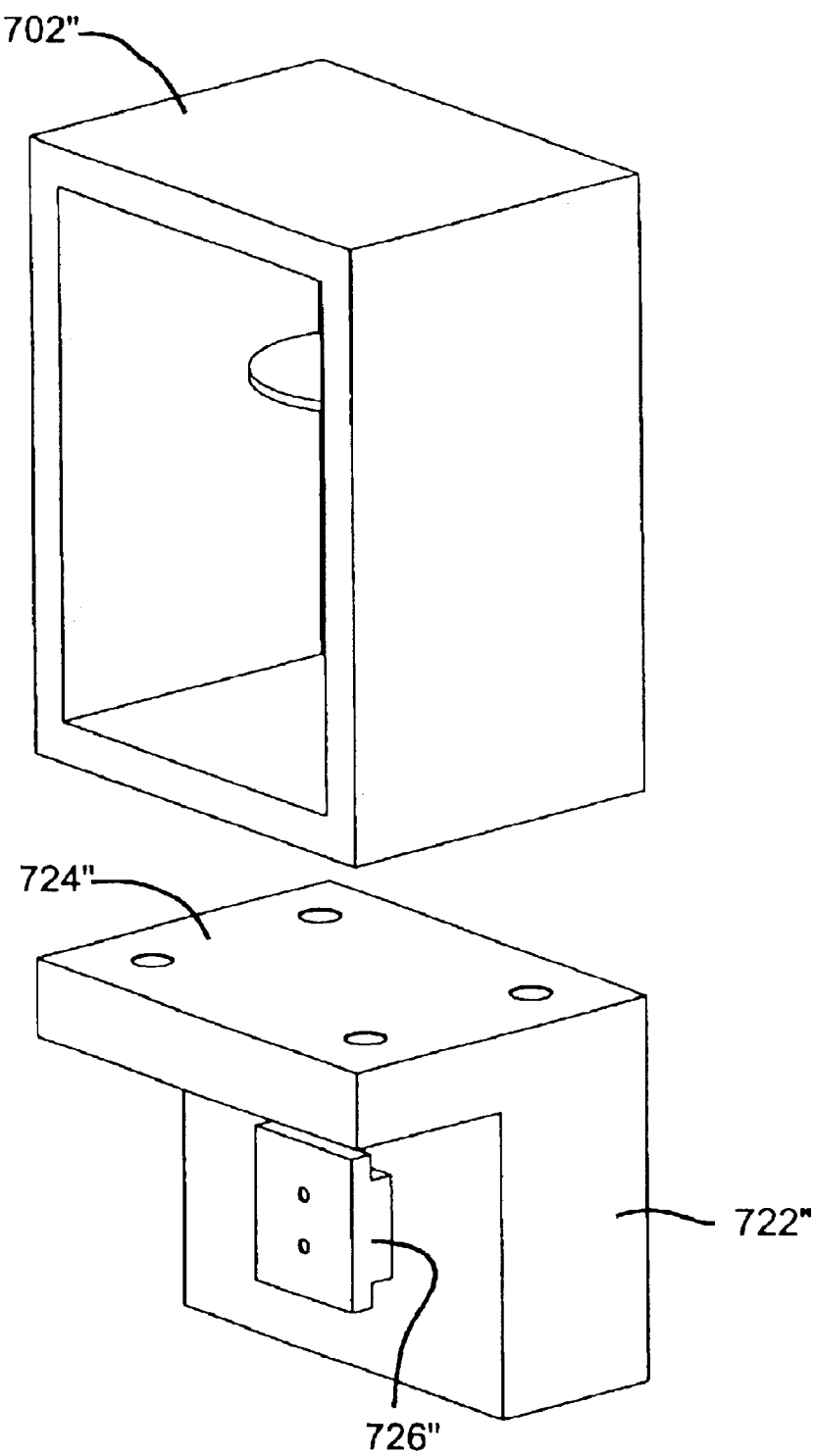
FIGS. 15–17 illustrates a second exemplary application of the modular non-contact measurement device to a table saw in accordance with the present invention.
Figure 16:
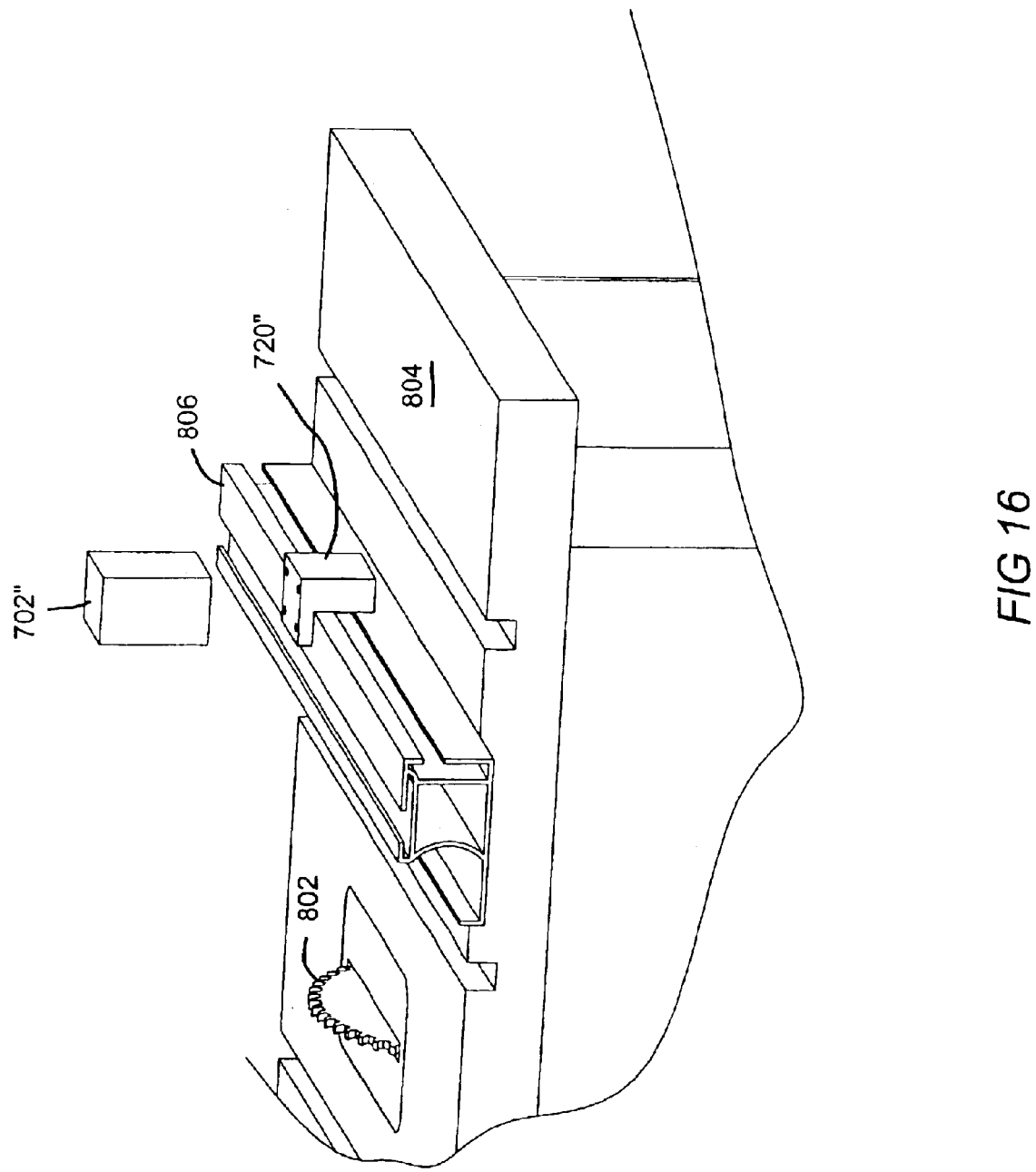
Figure 17:
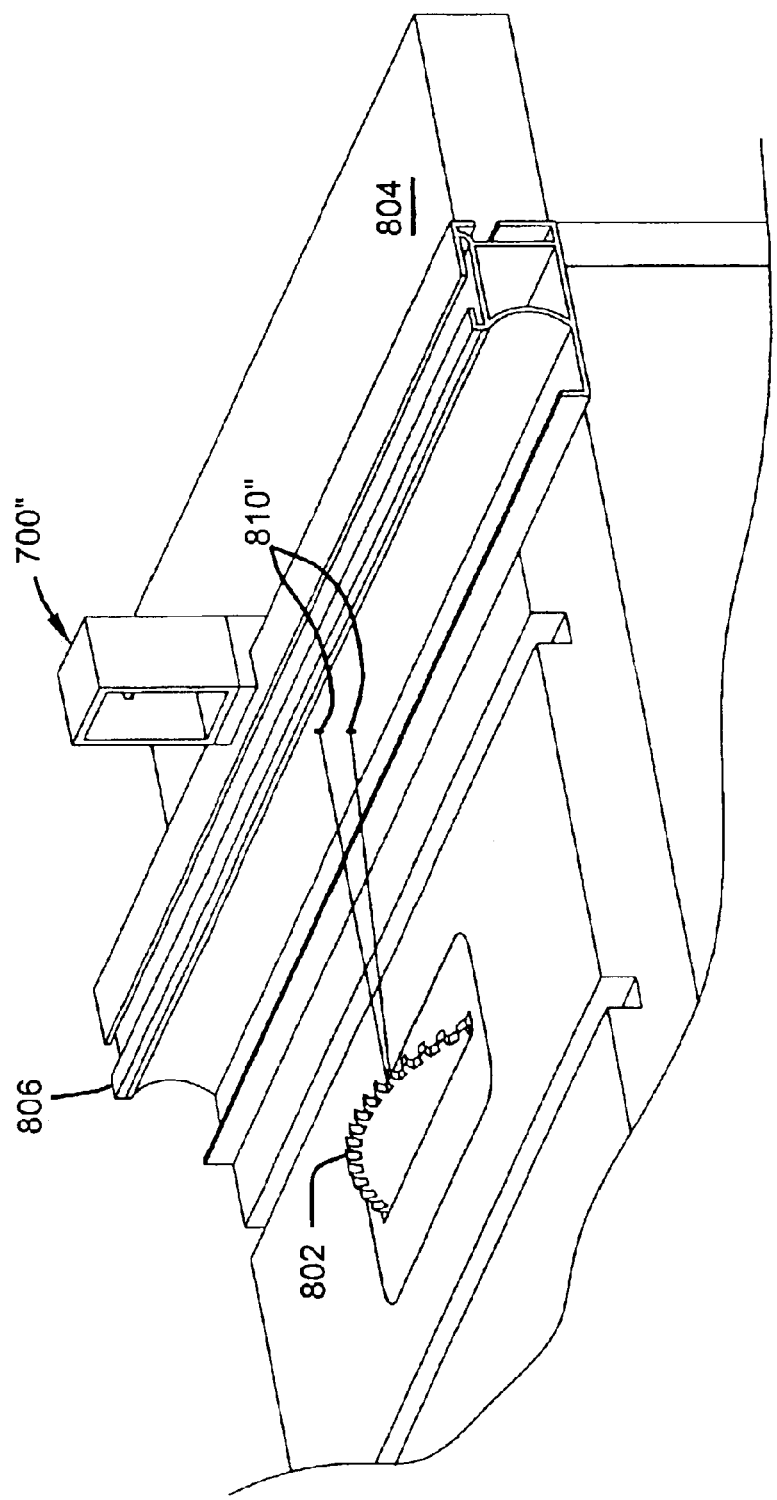

In FIGS. 15–17, the laser base 720" is formed in a L-shape having an attachment portion 722" and an engagement portion 724". The laser base 720" further includes a mounting flange 726" extending outwardly from the attachment portion 722". The mounting flange 726" slidably couples the laser base 720" to a channel 812" integrally formed in the guide fence 806 as shown in FIG. 14. Again, the guide fence 806 may be further modified to include pass-thru holes 810" which enable light to be projected from the embedded laser diode(s) towards the saw blade 802. Lastly, the portable measurement module 702" is coupled to a top surface of the engagement portion 722" of the laser base 720" to form an operational measurement device 700".

In either of these two configurations, the measurement device may be used to take various measurements associated with the operation of the table saw. Applicable measurements may include (but is not limited to) the angle of the saw blade relative to the working surface, the height of the saw blade, the saw blade run out, the angle of the guide fence relative to the saw blade, the distance between the guide fence and the saw blade, and the height of a workpiece on the work table. One skilled in the art will readily recognize that other types of measurements are also within the scope of the present invention.

Accurate measurement data may be determined only when the portable measurement module understands the nature of the particular application. Computational algorithms for measurements associated with each application are preferably stored in the controller of the portable measurement module. Since laser bases may be designed for different applications, each laser base may be configured to provide an indication of the particular application to the portable measurement module. In one exemplary embodiment, laser bases designed for different applications employ resistor elements having different values, such that the portable measurement module is able to determine the applications based on the detected resistive value. It is understood that other techniques for determining the particular application are also within the broader aspects of the present invention. It is also envisioned that computational algorithms may optionally be embedded in a controller that resides in the laser base.

Figure 18:
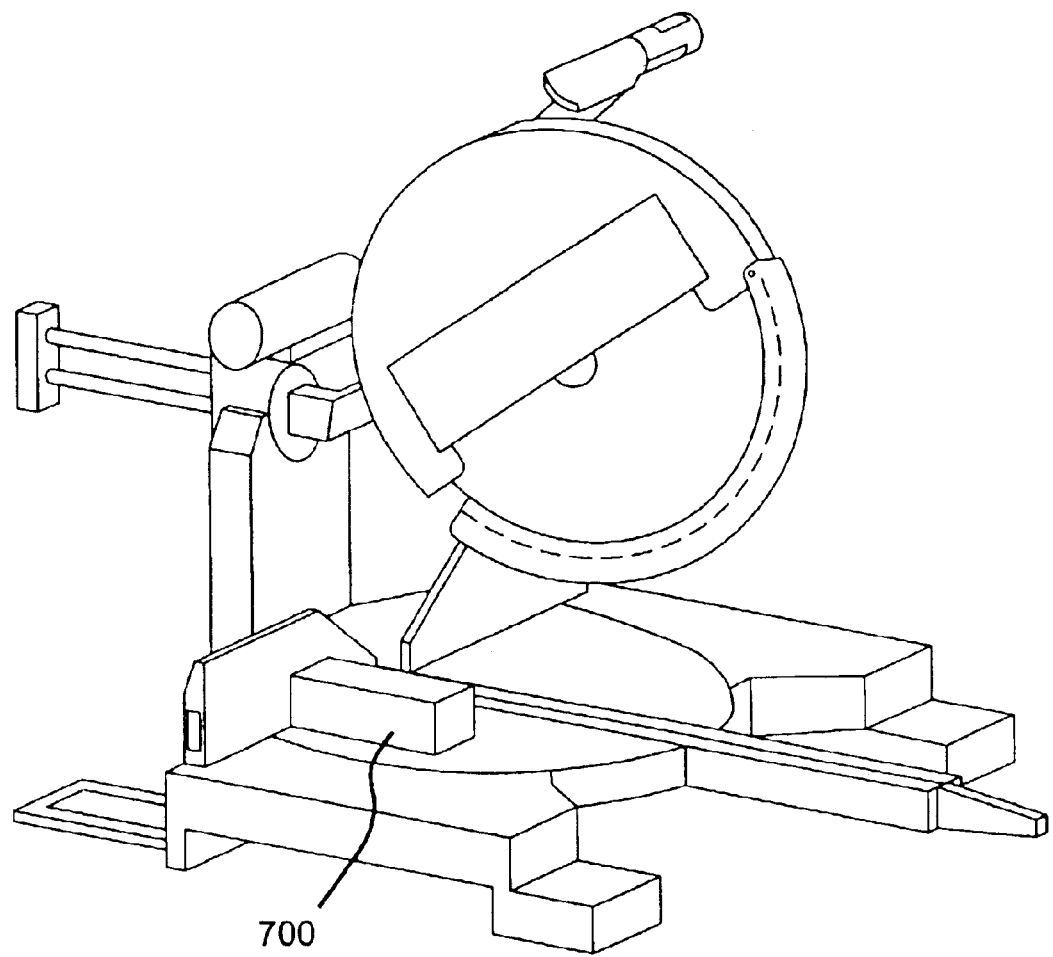
Figure 19:
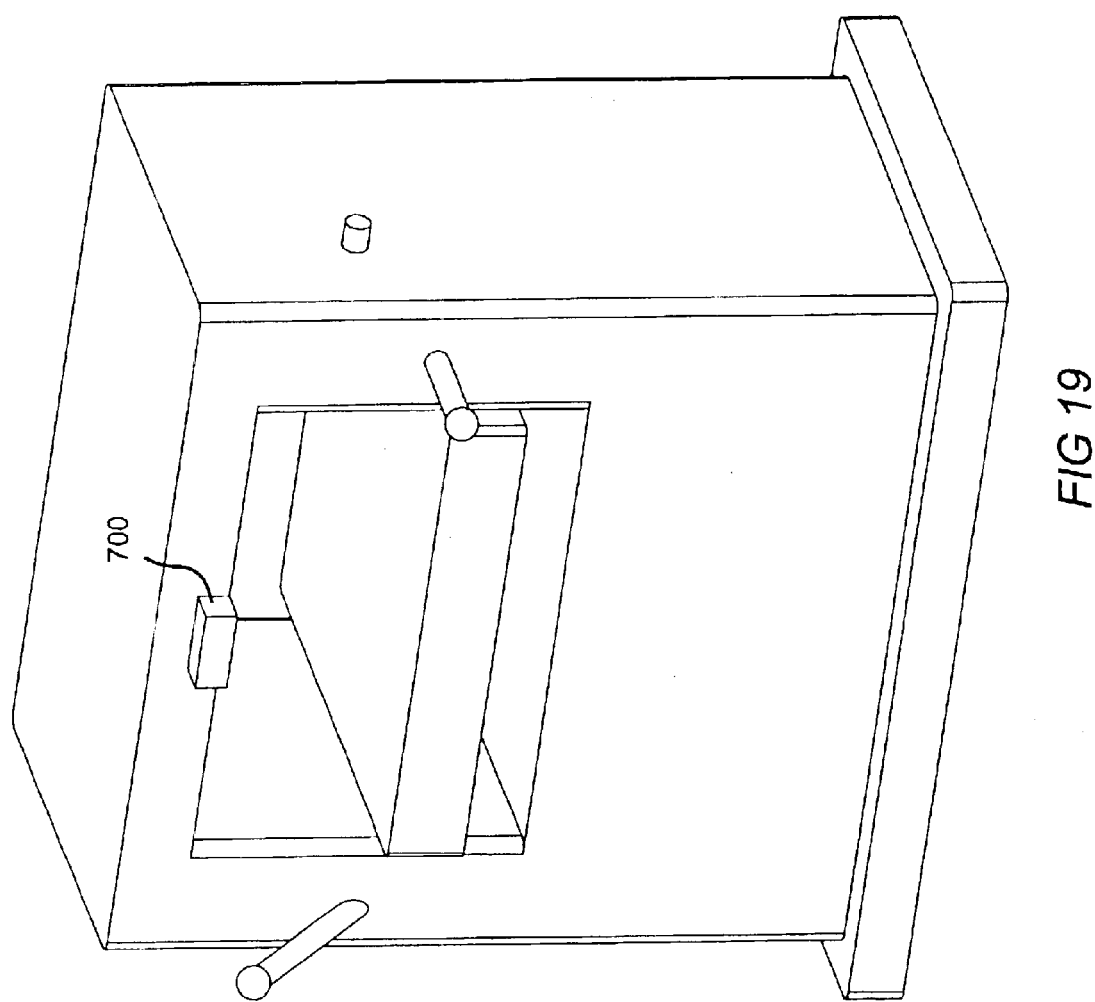

While the above description is provided with reference to a table saw, it is readily understood that the modular measurement device may also be adapted to use with other types of power tool assemblies, such as radial arm saws, band saws, drill presses, router, shapers, planers, joiners, and lathes; at least some of these applications are illustrated in FIGS. 18–20. It is also understood that other techniques may be employed for coupling the laser base to the various power tool assemblies.

From the foregoing, it will be appreciated that the present invention provides a significant advance in the art of portable measurement devices. The invention quickly and accurately performs non-contact measurements of dimensions and/or angles associated with various objects in a commercial or residential work area. While the invention has been described in its presently preferred form, it will be understood that the invention is capable of modification without departing from the spirit of the invention as set forth in the appended claims.

What is claimed is:

1. A modular non-contact measurement device, comprising:

a laser base adapted to couple to a power tool and operable to project light onto a measured object; and a portable measurement module adapted to receive light reflected from a surface of the measured object and operable to determine dimensional measurement data for the measured object, wherein the portable measurement module is configured to releasably couple to the laser base.

2. The modular non-contact measurement device of claim 1 wherein the portable measurement module is magnetically coupled to the laser base.

3. The modular non-contact measurement device of claim 1 wherein the portable measurement module includes:

a housing assembly;

an user input element integrated with the housing assembly and operable to generate a trigger signal to initiate measurement of the measured object;

a sensing element mounted in the housing assembly, the sensing element adapted to receive the trigger signal and operable to collect image data; and an image processor mounted in the housing assembly, the image processor adapted to retrieve the image data from the sensing element and operable to convert the image data into dimensional measurement data for the measured object.

4. The modular non-contact measurement device of claim 3 wherein the laser base includes one or more laser diodes.

5. The modular non-contact measurement device of claim 3 wherein the portable measurement module further includes a power source and the laser base is adapted to receive electrical power from the power source residing in the portable measurement module.

6. The modular non-contact measurement device of claim 3 wherein the portable measurement module electrically connects via an electrical mating contact with the laser base when the portable measurement module is coupled to the laser base.

7. The modular non-contact measurement device of claim 1 wherein the measured object is selected from the group consisting of a workpiece, an active member of the power tool, and a guide member associated with the power tool.

8. The modular non-contact measurement device of claim 1 wherein the power tool is selected from the group comprising a table saw, a miter saw, a radial arm saw, a band saw, a drill press, a router, a planar, a joiner, and a lathe.

9. The modular non-contact measurement device of claim 1 wherein the power tool is further defined as a table saw having a work surface, a saw blade extending through the work surface, and a movable guide fence disposed on the work surface, such that the measurement data is selected from the group consisting of an angle of the saw blade relative to the measurement module, height of the saw blade, saw blade run out, an angle of the guide fence relative to the saw blade, distance between the guide fence and the saw blade, and height of a workpiece on the work surface.

10. A modular non-contact measurement device, comprising:

a laser base adapted to couple to a power tool; and a portable measurement module operable to project light onto a measured object, the portable measurement module adapted to receive light reflected from a surface of the measured object and operable to determine dimensional measurement data for the measured object, wherein the portable measurement module is configured to releasably couple to the laser base and includes a first housing assembly releasably coupled to a second housing assembly; the first housing assembly including an user input element integrated with the housing assembly and operable to generate a trigger signal to initiate measurement of the measured object and a wireless transceiver device operable to communicate the trigger signal via a wireless connection to the second housing assembly; and the second housing assembly including a wireless transceiver device adapted to receive the trigger signal from the first housing assembly, a sensing element adapted to receive the trigger signal and operable to collect image data and an image processor adapted to retrieve the image data from the sensing element and operable to convert the image data into dimensional measurement data for the measured object.

11. The modular non-contact measurement device of claim 10 wherein the portable measurement module is magnetically coupled to the laser base.

12. The modular non-contact measurement device of claim 10 wherein the portable measurement module includes one or more laser diodes.

13. The modular non-contact measurement device of claim 10 wherein the portable measurement module further includes:

a housing assembly;

an user input element integrated with the housing assembly and operable to generate a trigger signal to initiate measurement of the measured object;

a sensing element mounted in the housing assembly, the sensing element adapted to receive the trigger signal and operable to collect image data; and an image processor mounted in the housing assembly, the image processor adapted to retrieve the image data from the sensing element and operable to convert the image data into dimensional measurement data for the measured object.

14. A method for acquiring non-contact measurement data at two different power tools, comprising:

providing a first laser base positioned proximate to a first power tool, the laser base being operable to project light onto a first measured object associated with the first power tool;

coupling a portable measurement module to the first laser base to form a first non-contact measurement device, the portable measurement module being adapted to receive light reflected from a measured object and operable to determine measurement data for the measured object;

determining measurement data for the first measured object using the first non-contact measurement device;

providing a second laser base positioned proximate to a second power tool, the second laser base being operable to project light onto a second measured object associated with the second power tool;

uncoupling the portable measurement module from the first laser base and coupling the portable measurement module to the second laser base to form a second non-contact measurement device; and determining measurement data for the second measured object using the second non-contact measurement device.

15. The method of claim 14 wherein the step of coupling a portable measurement module further comprises configuring at least one of the portable measurement module and the first laser base with one or more magnetic contact areas and positioning the portable measurement module and the first laser base in surface contact with each other, thereby magnetically coupling the portable measurement module to the first laser base.

16. The method of claim 15 wherein the step of determining measurement data further comprises:

triggering a measurement of the first measured object;

projecting light onto a surface of the first measured object;

capturing light reflected from the surface of the first measured object;

generating image data from the captured light, the image data being representative of the surface of the measured object; and converting the image data into dimensional measurement data for the measured object.

* * * * *